US010158840B2

(12) United States Patent
Mishra et al.

(10) Patent No.: US 10,158,840 B2
(45) Date of Patent: Dec. 18, 2018

(54) STEGANOGRAPHIC DEPTH IMAGES

(71) Applicant: Amazon Technologies, Inc., Seattle, WA (US)

(72) Inventors: Pragyana K. Mishra, Seattle, WA (US); Dushyant Goyal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 239 days.

(21) Appl. No.: 14/744,480

(22) Filed: Jun. 19, 2015

(65) Prior Publication Data

US 2016/0373722 A1  Dec. 22, 2016

(51) Int. Cl.
H04N 5/00 (2011.01)
H04N 13/178 (2018.01)
H04N 13/15 (2018.01)
G06T 1/00 (2006.01)
H04N 1/32 (2006.01)
H04N 5/232 (2006.01)
H04N 9/04 (2006.01)
H04N 13/207 (2018.01)
H04N 13/271 (2018.01)

(52) U.S. Cl.
CPC ......... H04N 13/178 (2018.05); G06T 1/0028 (2013.01); H04N 1/32229 (2013.01); H04N 1/32309 (2013.01); H04N 5/232 (2013.01); H04N 9/045 (2013.01); H04N 13/15 (2018.05); H04N 13/207 (2018.05); H04N 13/271 (2018.05); G06T 2201/0051 (2013.01); G06T 2207/10012 (2013.01); G06T 2207/10024 (2013.01)

(58) Field of Classification Search
CPC ..... H04N 13/00; H04N 19/00; H04N 13/0048
See application file for complete search history.

(56) References Cited

U.S. PATENT DOCUMENTS 7,406,214 B2   7/2008 Rhoads et al.
8,521,217 B2   8/2013 Rodriguez
(Continued)

FOREIGN PATENT DOCUMENTS

EP   2963926 A1   1/2016
WO   2014015460 A1   1/2014

OTHER PUBLICATIONS

International Search Report and Written Opinion of PCT Application No. PCT/US2016/038156 dated Oct. 4, 2016.
(Continued)

Primary Examiner — Frank F Huang
(74) Attorney, Agent, or Firm — Athorus, PLLC

(57) ABSTRACT

Depth information may be encoded into pixels of visual imaging data according to steganographic techniques. The depth information may be captured simultaneously with the visual imaging data, and one or more representative pixels may be identified within a region or sector of the visual imaging data according to a pixel traversal strategy. The depth information corresponding to the region or sector may be encoded into one or more least significant bits of the representative pixels, and a modified set of imaging data including the visual imaging data with the depth information encoded into the representative pixels may be stored in a data store and used for any relevant purpose.

21 Claims, 12 Drawing Sheets

(56) References Cited

U.S. PATENT DOCUMENTS

| | | | |
|---|---|---|---|
| 9,294,754 B2* | 3/2016 | Billerbeck | H04N 13/0203 |
| 2002/0023218 A1 | 2/2002 | Lawandy et al. | |
| 2003/0193659 A1* | 10/2003 | Uomori | G01B 11/25 |
| | | | 356/3.1 |
| 2009/0251597 A1 | 10/2009 | Suzuki et al. | |
| 2011/0149031 A1* | 6/2011 | Um | H04N 13/0011 |
| | | | 348/43 |
| 2011/0285825 A1* | 11/2011 | Tian | H04N 9/646 |
| | | | 348/47 |
| 2011/0286661 A1* | 11/2011 | Lee | H04N 13/0022 |
| | | | 382/154 |
| 2011/0311144 A1* | 12/2011 | Tardif | G10L 15/25 |
| | | | 382/195 |
| 2012/0001875 A1* | 1/2012 | Li | G01S 7/5273 |
| | | | 345/177 |
| 2012/0140019 A1* | 6/2012 | Jung | H04N 7/147 |
| | | | 348/14.02 |
| 2013/0107005 A1* | 5/2013 | Lim | H04N 5/33 |
| | | | 348/46 |
| 2013/0242058 A1* | 9/2013 | Bae | H04N 13/0271 |
| | | | 348/47 |
| 2013/0301906 A1* | 11/2013 | Yoon | G06T 17/00 |
| | | | 382/154 |
| 2014/0072205 A1* | 3/2014 | Ishii | G06T 15/08 |
| | | | 382/154 |
| 2015/0061509 A1* | 3/2015 | Karlicek | G06K 9/00369 |
| | | | 315/153 |
| 2016/0063611 A1 | 3/2016 | Davis et al. | |
| 2016/0094829 A1* | 3/2016 | Georgiev | H04N 19/00 |
| | | | 348/43 |

OTHER PUBLICATIONS

Seung-Chan Kim et al., "Feeling the Unseen", Apr. 27, 2013, pp. 727-732, ISBN: 978-1-4503-1952-2.

Zhenyu Wang et al., "Depth Template Based 2D-to-3D Video Conversion and Coding System," Multimedia and Expo (ICME), 2012, IEEE, Jul. 9, 2012, pp. 308-313, ISBN: 978-1-4673-1659-0.

* cited by examiner

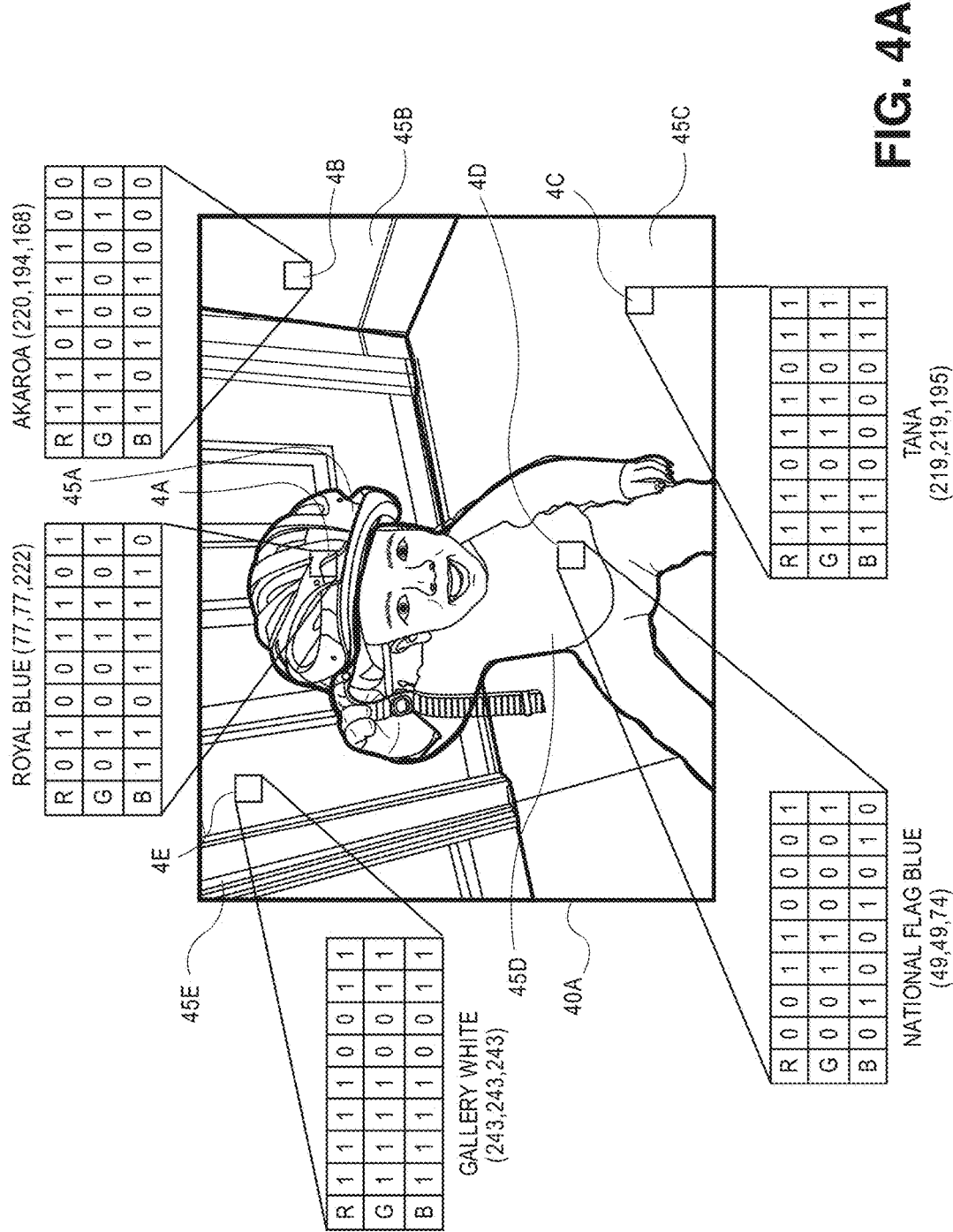

US 10,158,840 B2

STEGANOGRAPHIC DEPTH IMAGES

BACKGROUND

A digital image is a collection of pixels, typically arranged in an array, which defines an optically formed reproduction of one or more objects, backgrounds or other features of a scene. In a digital image, each of the pixels represents or identifies a color or other light condition associated with a portion of such objects, backgrounds or features. For example, a black-and-white digital image includes a single bit for representing a light condition of the pixel in a binary fashion (e.g., either black or white), while a grayscale digital image may represent the light condition in multiple bits (e.g., two to eight bits for defining tones of gray in terms of percentages or shares of black-and-white), and a color digital image may include groups of bits corresponding to each of a plurality of base colors (e.g., red, green or blue), and the groups of bits may collectively represent a color associated with the pixel. One common digital image is a twenty-four bit (24-bit) color digital image, in which each of the pixels includes three channels of eight bits each, including a first channel of eight bits for describing an extent of red within a pixel, a second channel of eight bits for describing an extent of green within the pixel, and a third channel of eight bits for describing an extent of blue within the pixel.

A depth image, or a depth map, is also a collection of pixels that defines an optically formed reproduction of one or more objects, backgrounds or other features of a scene. Unlike the pixels of a digital image, however, each of the pixels of a depth image represents or identifies not a light condition or color of such objects, backgrounds or features, but a distance to objects, backgrounds or features. For example, a pixel of a depth image may represent a distance between a sensor of an imaging device that captured the depth image (e.g., a depth camera or range sensor) and the respective object, background or feature to which the pixel corresponds.

Various efforts have been undertaken to incorporate or interpose depth or distance information into the pixels of a digital image. For example, where a color image includes three channels of bits each corresponding to one of the base colors of red, green and blue (viz., an RGB digital image), a fourth channel of bits corresponding to depths to objects may be appended to the three channels of bits, and a composite color and depth image (e.g., an RGBz or RGBD image) may be formed thereby. However, incorporating additional bits of depth data, e.g., additional channels of such bits, into color, grayscale or black-and-white imaging data necessarily increases the sizes of files in which such imaging data is stored, even where the color, grayscale or black-and-white imaging data is not of the highest resolution.

BRIEF DESCRIPTION OF THE DRAWINGS

FIG. 4A, FIG. 4B and FIG. 4C are views of aspects of one process for encoding steganographic depth images in accordance with embodiments of the present disclosure.

DETAILED DESCRIPTION

Figure 1A:
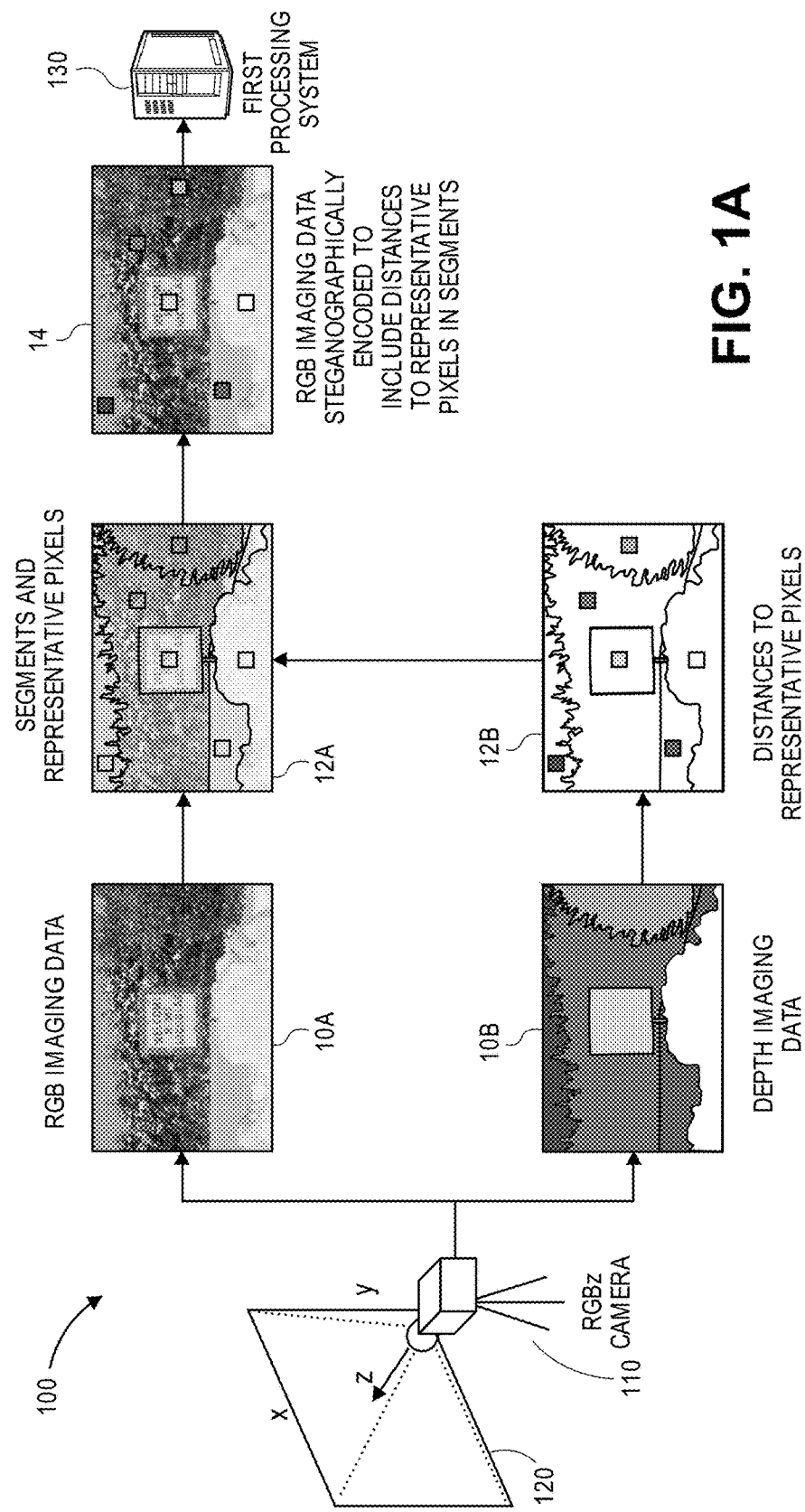
FIG. 1A and FIG. 1B are views of aspects of a system for encoding or decoding steganographic depth images in accordance with embodiments of the present disclosure.

As is set forth in greater detail below, the present disclosure is directed to steganographic depth images. More specifically, the systems and methods of the present disclosure are directed to steganographically incorporating depth information or data corresponding to objects, backgrounds or other features of a visual image (e.g., a digital image including color, grayscale or black-and-white pixels) into one or more representative pixels of the visual image. The representative pixels may be modified by supplanting data stored in least significant bits or less significant bits thereof (e.g., lowest-valued bits of a grayscale pixel, or lowest-valued bits of one or more channels of a color pixel) with data corresponding to depths associated with the representative pixels. The systems and methods of the present disclosure may thus effectively co-opt one or more bits of data indicative of a color of a pixel of a visual image in order to store bits of data indicative of a depth for the pixel. The representative pixels for storing depth information or data may be selected on any basis, including but not limited to their respective locations within the visual image, or values or attributes of the color of the pixels or their associated depth, or at random.

In some embodiments of the present disclosure, a visual image may be segmented into one or more discrete, contiguous regions according to a segmentation algorithm or technique, and a representative pixel may be selected from one or more of the contiguous regions of the visual image in order to steganographically incorporate depth information or data from a corresponding pixel of a depth image (e.g., a pixel in the depth image that is in the same location or corresponds to the same object as the representative pixel in the visual image) therein. The segmentation algorithm or technique may define such contiguous regions on any basis, including but not limited to the presence or absence of one or more edges, contours, outlines, colors, textures, silhouettes, shapes or other characteristics within the visual image. Additionally, the representative pixels may be selected according to a pixel traversal strategy (or pixel selection strategy) that considers any relevant attributes of the visual image or the depth image according to a predetermined technique, including values of the various data within the pixels (e.g., specific colors or shades of gray of the visual image, or specific absolute or relative values of distances of the depth image).

Once representative pixels within a segmented region or sector of a visual image have been identified, information or data indicative of depths associated with the region or sector may be encoded into one or more least significant bits (or less significant bits or bytes) of the representative pixels, and a steganographic depth image formed thereby may be stored in one or more data stores or subject to one or more local or remote evaluations or processing techniques. In some embodiments of the present disclosure, the information or data indicative of the depths associated with the region or sector is identified within pixels of a depth image that correspond to the representative pixels of the visual image, e.g., pixels in the same location in the depth image as the representative pixels in the visual image. In other embodiments, the information or data indicative of the depths associated with the region or sector may include, but is not limited to, depths of individual pixels within the region or sector, or minimum, maximum, mean or median depths of the pixels within the region or sector. Subsequently, the steganographic depth image formed by encoding the depth information or data corresponding to the region or sector into representative pixels of the visual image within the region or sector may be decoded to extract the depth information or data, and the visual image and/or such depth information or data may be utilized for any purpose.

Figure 1B:
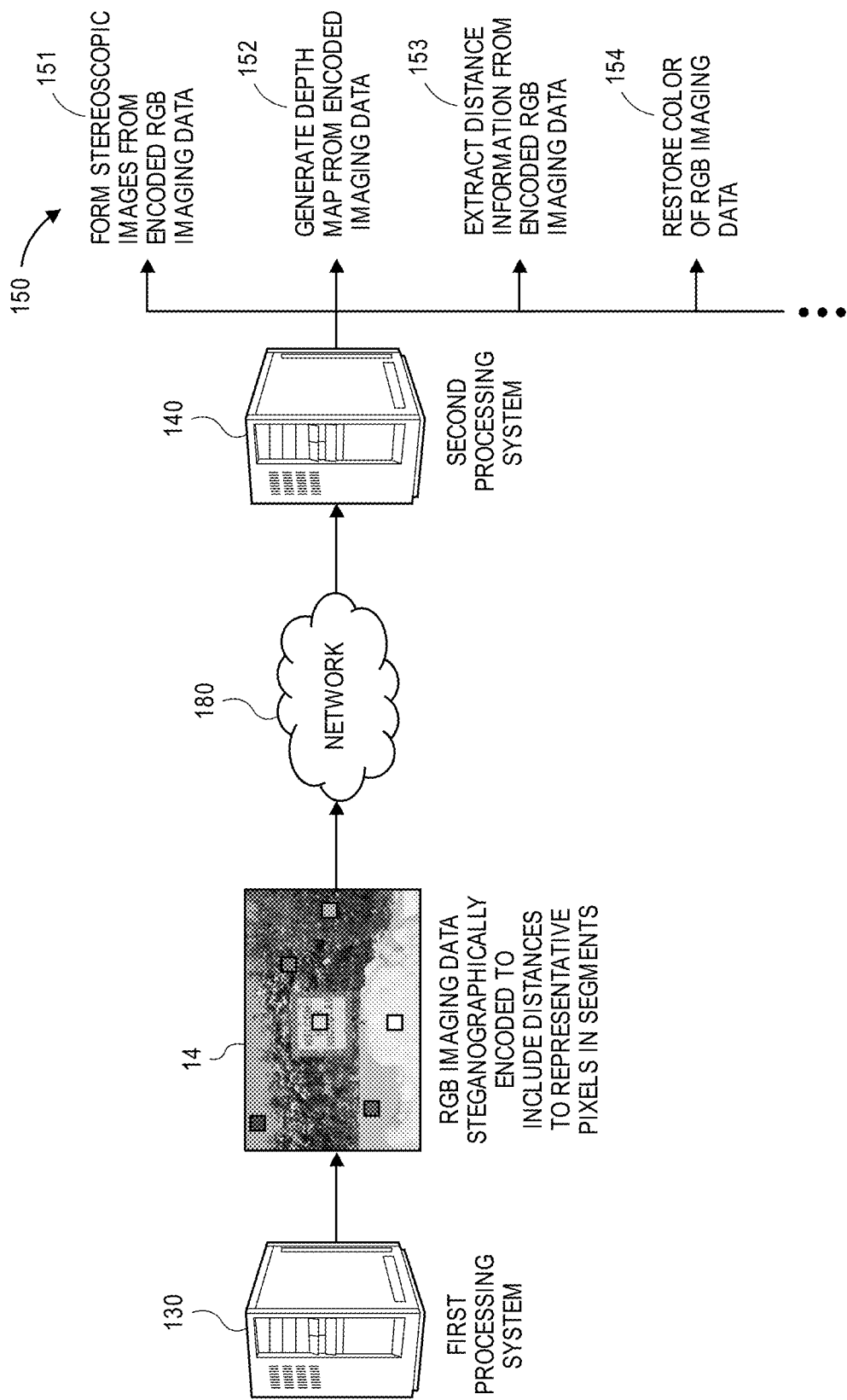

Referring to FIG. 1A and FIG. 1B, views of aspects of a system 100 for encoding or decoding steganographic depth images in accordance with embodiments of the present disclosure are shown. Referring to FIG. 1A, an imaging device 110 configured to capture both visual imaging data and depth imaging data (e.g., an RGBz camera, or RGBD camera) is aligned to capture imaging data from a scene 120. The imaging data captured by the imaging device 110 includes both RGB imaging data 10A (or other visual imaging data, such as grayscale imaging data or black-and-white imaging data) and depth imaging data 10B of the scene 120 from within the field of view of the imaging device 110.

In accordance with embodiments of the present disclosure, the RGB imaging data 10A may be processed into a set of segmented imaging data 12A having one or more regions according to one or more segmentation algorithms or techniques, and a plurality of representative pixels may be identified within each of the segments of the segmented imaging data 12A on any basis. As is also shown in FIG. 1A, a set 12B of data including depths corresponding to the plurality of representative pixels identified in the segmented imaging data 12A may also be defined, based on the depth imaging data 10B. For example, as is shown in FIG. 1A, the scene 120 is a wintry setting including a sign mounted on a bank of snow, and the segmented imaging data 12A includes regions corresponding to the sign and the bank of snow, as well as regions corresponding to trees, hills and sky above a horizon. Representative pixels within each of the regions may be identified on any intrinsic or extrinsic basis, including but not limited to attributes of the colors or textures within such regions (e.g., the extent to which such colors or textures vary within such regions), or depths associated with such regions (e.g., depths of individual pixels within such regions, or minimum, maximum, mean or median depths of the pixels within such regions).

As is further shown in FIG. 1A, the set 12B of data including depths corresponding to the plurality of representative pixels may be steganographically encoded into the segmented imaging data 12A, to form a steganographic depth image 14 that is a composite digital image formed from both RGB imaging data captured from the scene 120, as well as distances to the representative pixels identified within the scene 120. Once the depths to the representative pixels have been steganographically encoded into the RGB imaging data, the steganographic depth image 14 may be stored in at least one data store associated with a first processing system 130.

In accordance with embodiments of the present disclosure, the steganographic depth image 14 including both visual imaging data and depth imaging data may be utilized for any purpose. Referring to FIG. 1B, the steganographic depth image 14 may be transmitted from the first processing system 130 to a second processing system 140 over a network 180, e.g., in one or more synchronous or asynchronous messages. At the second processing system 140, the depth data may be extracted from the representative pixels, and the depth data or the RGB imaging data may be utilized for or subject to any of a plurality of processing functions 150, including but not limited to generating stereoscopic images 151, generating a depth map 152, extracting distance information 153 and utilizing the distance information for any purpose, restoring the colors of the RGB imaging data pixels 154 into which the depth data was steganographically encoded, or any other processing function contemplating the use of visual imaging data or depth imaging data captured from the scene 120.

Accordingly, embodiments of the systems and methods of the present disclosure may steganographically encode depth information or data corresponding to regions of a digital image within representative pixels of the digital image to form a composite digital image, e.g., a steganographic depth image, having both visual imaging data and depth imaging data. The regions may be defined using one or more segmentation algorithms or techniques, and the representative pixels may be selected on any basis in relation to the regions or the segmentation algorithms or techniques. Additionally, aspects of the composite depth image, i.e., either the encoded depth information or data or the color information, may be utilized for any purpose, such as by decoding the depth information or data therefrom and associating the depth information or data with the regions in which the representative pixels are located. As a result, distances to or depths of aspects expressed in imaging data may be quickly and efficiently incorporated into a color, grayscale or black-and-white image of such aspects without requiring the addition of a dedicated depth channel to imaging data having channels of color, grayscale or black-and-white data therein.

Imaging data in the form of visual imaging data, or depth imaging data, may be captured using one or more imaging devices such as digital cameras, depth sensors or range cameras. Such devices may generally operate by capturing light that is reflected from objects, and by subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light, or distances to objects from which the light was reflected. Such sensors may generate data files including such information, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet.

Imaging data files that are stored in one or more data stores may be printed onto paper, presented on one or more computer displays, or subjected to one or more analyses, such as to identify items expressed therein. Such data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), Quick-Time (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color candy apple red is expressed as #D61123. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Steganography is typically defined as the art, or the science, of embedding or concealing information or data within other information or data. In a computer-based context, steganographic techniques are commonly utilized to embed one or more bits of data, or streams of such bits, into one or more other bits of data, or one or more other streams of such bits. For example, information or data may be steganographically encoded into imaging data, e.g., files including one or more still or moving images, without altering the information or data being encoded, and without substantially altering the imaging data to an appreciable degree.

To date, steganography has been extensively and nearly exclusively used for encrypting hidden information or metadata into digital files, such as images. For example, fraudsters, spammers or hackers are known to steganographically inject executable files into seemingly harmless images, and to send one or more of the steganographically altered images via electronic mail or other messaging techniques to a computer device of an unsuspecting recipient. Steganography is also believed to have been used in a number of military and law enforcement applications, as well.

According to some steganographic techniques, information or data may be encoded into one or more least significant bits or bytes of an image (or less significant bits or bytes of the image). For example, in a 24-bit digital image with pixels having three eight-bit channels (e.g., a red channel, a green channel and a blue channel), the available capacity for storing information in each pixel is substantial. Because each of the three eight-bit channels in a pixel may have two hundred fifty-six (i.e., two to the eighth power, $2^8$) unique values, each pixel of a three-channel 24-bit digital image may represent one of Ser. No. 16/777,216 (e.g., two to the eighth power cubed, $(2^8)^3$; or two hundred fifty-six cubed, $256^3$) unique colors. Therefore, some steganographic techniques operate by identifying one or more least significant bits or bytes, or less significant bits or bytes of the image, in one or more of the channels of a pixel, and replacing one or more of such least significant bits or bytes with information or data, without causing any visual degradation of the image For example, by storing information or data within a single least significant bit of each of three color channels in a pixel, the number of unique colors that may be represented in the pixel is reduced to 2,097,152 (e.g., by one-eighth). In an image of substantially high resolution, the reduction in the number of available colors that may be represented using the remaining seven bits of each of the three channels of the pixel is typically indiscernible to the human eye. However, such a reduction provides three bits for storing additional information or data within each of the pixels of the 24-bit digital image. In a standard 3.1 megapixel (MP) digital image having dimensions of 2048×1536 pixels, nearly nine-and-one-half million bits, or 1.2 megabytes (MB) of storage may be so provided.

Similarly, steganographically storing information or data within two least significant bits of each of the three color channels in a 24-bit digital image pixel reduces the maximum number of unique colors that may be represented in such pixels to 262,144 (e.g., by one-sixty-fourth, or two to the negative sixth power, $2^{-6}$), which is also likely indiscernible to the human eye, and yet may create up to an additional 2.4 megabytes (MB) of storage capacity within a standard 3.1 megapixel digital image, without typically increasing a size of the file. Likewise, steganographically storing information or data within three least significant bits of each of the three color channels in a 24-bit digital image pixel reduces the number of unique colors that may be represented in such pixels to 32,768 (e.g., by one-five-hundred-twelfth, or two to the negative ninth power, $2^{-9}$), which is also likely indiscernible to the human eye, but may create up to an additional 3.5 megabytes (MB) of storage capacity within a standard 3.1 megapixel digital image, without typically increasing a size of the file.

Thus, steganography and steganographic techniques may require an image to sacrifice resolution (e.g., color quality in visual imaging data, or depth precision in depth imaging data), but may, in exchange for this sacrifice, provide an internal storage means within the image to store one or more bits of information or data.

The systems and methods of the present disclosure are directed to utilizing steganographic techniques for encoding depth information or data into visual imaging data (e.g., color imaging data, well as black-and-white or grayscale imaging data) to form a steganographic depth image. The visual imaging data and the depth information or data may be captured from any type or form of imaging device including but not limited to a red, green, blue ("RGB") color camera, a still camera, a motion capture/video camera, as well as imaging devices or other devices that are configured to capture depth information or data, including depth-sensing cameras such as RGBz (or RGBD) cameras. In some other implementations, one or more of the cameras may be a thermographic or infrared (IR) camera.

After visual imaging data and depth imaging data have been captured, the visual imaging data or the depth imaging data may be segmented into one or more regions or sectors on any basis, including but not limited to one or more segmentation algorithms or techniques. Such algorithms or techniques may partition a black-and-white, grayscale, color or other multi-spectral image into one or more non-overlapping regions of pixels that are homogeneous in nature. For example, such homogenous regions of an image may be defined with respect to one or more edges, contours, outlines, colors, textures, silhouettes, shapes or other characteristics of objects, or portions of objects, expressed in still or moving digital images, or clustered together according to one or more statistical methods, artificial neural networks, K-means clustering, latent Dirichlet allocations, Bayesian classifiers, sparse dictionary learning techniques, which may be applied to such images in order to detect and recognize contents thereof as forming or belonging to a region or sector in accordance with the present disclosure.

Additionally, because the visual imaging data and the depth imaging data from which a steganographic depth image is formed may be captured from the same scene, and from the same fields of view, preferably simultaneously, a segmenting algorithm or technique may segment either the visual imaging data or the depth imaging data individually, or both the visual imaging data and the depth imaging data collectively, in order to identify such regions or sectors. Furthermore, where a map, an outline, a layer or other set of data defining such regions or sectors is generated according to a segmentation algorithm or technique using one set of imaging data captured from a scene (e.g., either visual imaging data or depth imaging data), the map, the outline, the layer or the other set of data may be applied to another set of imaging data (e.g., the other of the visual imaging data or the depth imaging data) captured from the same scene.

When imaging data captured from a scene has been segmented into one or more regions or sectors, representative pixels may be identified within the visual imaging data. According to some embodiments of the present disclosure, representative pixels may be identified according to a pixel traversal strategy or technique that systematically evaluates pixels within segmented regions or sectors of visual imaging data (e.g., color, grayscale or black-and-white pixels) and identifies and selects representative pixels within the visual imaging data, e.g., within the segmented regions or sectors therein according to one or more segmentation techniques, for storing depth information or data corresponding to such segmented regions or sectors. For example, the representative pixels may be identified at random, or in specific locations within imaging data (e.g., predefined locations within the images, such as in a grid or according to a pattern, or based on a rectangular or polar coordinate system centered or based in one or more specific locations of the imaging data). A pixel traversal strategy may identify single, isolated representative pixels within segmented region or sectors of visual imaging data on an individual basis, and such pixels may be individually encoded with depth information or data corresponding to such pixels. Alternatively, a pixel traversal strategy may identify one or more sets or subsets of representative pixels within such segmented regions or sectors (e.g., grids or groupings of pixels), one or more of which may be ultimately selected for encoding with depth information or data corresponding to such pixels.

In some other embodiments of the present disclosure, representative pixels may be identified in locations identified based on attributes of the imaging data. For example, representative pixels may be identified or defined within visual imaging data or depth imaging data as a function of variations of pixel-level intensities within the imaging data, which may be quantitatively determined by recognizing various texture properties within the imaging data, comparing numerical measures of the relative intensities of pixels or textons within the visual imaging data to one another, or on any other basis. Representative pixels may be defined based on one or more repetitive patterns observed within visual imaging data or depth imaging data, i.e., locations within the imaging data where the properties of the imaging data are constant, varying slowly, or substantially periodic in nature, and may be recognized using one or more algorithms or machine-learning tools. Any means or model for selecting representative pixels from a set of imaging data (e.g., a still or moving black or white, grayscale, color or depth image captured from a scene) may be utilized in accordance with the present disclosure.

Once representative pixels have been identified within a segmented region or sector, depths, ranges or other distance information corresponding to the segmented region or sector may be identified within a depth image or other set of depth imaging data, and encoded into corresponding pixels within a color image or other set of visual imaging data to form a steganographic depth image. Where a depth image includes pixels having a single channel of bits representing depths or distances to objects within the image, the bits representing the depths or distances to the objects associated with the representative pixels may be identified. Such bits may be steganographically encoded into one or more of the least significant color, grayscale or black-and-white bits of channels of pixels of visual imaging data (e.g., bits of a single channel of a grayscale imaging data, or bits of multiple channels corresponding to base colors within the imaging data) without significantly impacting the overall quality of the visual imaging data.

For example, in a 24-bit representative pixel of visual imaging data, some of the least significant bits of each of the color channels may be co-opted and embedded with depth imaging data corresponding to such pixels. Six bits of depth imaging data, for example, may be embedded into two bits of each of three channels (e.g., red, green and blue) of visual imaging data. As is discussed above, when using two bits of each of the three channels in a representative color pixel to store depth imaging data, the number of colors that may be represented in the color pixel drops from 16,777,216 to 262,144, or by one sixty-fourth, a difference that may not be readily discerned by the human eye, even when the representative pixel is viewed independent from other color pixels. When the representative color pixel is surrounded by tens, hundreds or even thousands of other color pixels that have not been so altered, however, the difference in color quality between the representative color pixel and the other color pixels is functionally insignificant. Those of ordinary skill in the pertinent arts will recognize that imaging data having pixels of more than twenty-four bits (e.g., thirty bits, thirty-six bits, forty-eight bits, two hundred fifty-six bits), or fewer than twenty-four bits, may be utilized to generate a steganographic depth image.

In some embodiments of the present disclosure, a representative pixel located in a portion of a segmented region or sector of visual imaging data having a comparatively high level of variance among colors or textures shown therein, or a comparatively low signal-to-noise ratio, may be identified and selected for encoding depth information or data. For example, because the encoding of depth information or data into one or more bits of a color pixel will cause a slight reduction in the number of colors that may be represented within the color pixel, e.g., from 16,777,216 to 262,144, where two bits of each of a red channel, a blue channel and a green channel of an RGB imaging pixel are replaced with depth information or data, representative pixels may be selected in locations of RGB imaging data where the reduction in the number of colors is less likely to be noticed. These locations among the visual imaging data may be generally characterized as having originally high variances, e.g., high amounts or extents of image noise, in color, grayscale or black-and-white pixels of segmented regions or sectors, such that replacing one or more bits of the visual imaging pixels with depth information or data will result in minimal noise or disruptions to the visual imaging data as a whole. Locations of visual imaging data with low variances in the color, grayscale or black-and-white pixels of the segmented regions or sectors, or a comparatively high signal-to-noise ratio, are less favorable for storing depth information or data therein.

Therefore, in accordance with the present disclosure, when evaluating the pixels of a segmented region or sector in order to identify one or more representative pixels into which depth information or data may be encoded, a pixel traversal strategy may consider factors or variables pertaining to the variances in image noise such as signal-to-noise ratios or other related factors or variables. For example, a predetermined threshold for a pixel variance or signal-to-noise ratio may be determined for each of a plurality of segmented regions or sectors, or for a given segmented region or sector, and all pixels having variances below a first threshold, or signal-to-noise ratios above a second threshold, may be excluded from consideration as representative pixels.

In accordance with the present disclosure, depth information or data obtained from a single pixel of a set of depth imaging data may be incorporated into one or more representative pixels of regions or sectors of the visual imaging data. For example, where a depth value to be stored within a segmented region or sector includes a predetermined number of bits or bytes, such bits or bytes may be stored within a single color, grayscale or black-and-white pixel, or spread across multiple color, grayscale or black-and-white pixels and encoded therein. Additionally, the information or data that may be encoded into pixels of visual imaging data is not limited to depth information or data, e.g., distances to objects expressed within such pixels of visual imaging data. Rather, in addition to depths or distances, metadata (e.g., a label for a region), descriptors (e.g., a mathematical or logical description of a region or the colors or depths shown therein) or any other information or data relating to such regions or sectors may be steganographically encoded into visual imaging data in accordance with the present disclosure.

The depth information or data encoded into least significant bits of representative pixels of visual imaging data may represent or indicate distances to objects associated with such pixels in any manner. For example, the depth information or data may identify an absolute depth to an object associated with a representative pixel or a relative depth to the object. Alternatively, the depth information or data may represent a depth scale with respect to the visual imaging data. For example, where six total bits of a visual imaging data representative pixel are used for storing depth information or data, up to sixty-four unique depth values may be encoded therein. Thus, each of the values may correspond to one-sixty-fourth of a maximum range or threshold limit, ranging from zero to one hundred percent of the maximum range or the threshold limit. Thus, the accuracy or precision with which depth information or data encoded into visual imaging data representative pixels may signify depths to one or more objects is determined as a function of not only the number of representative pixels but also the number of bits of each of the representative pixels that are used to encode the depth information or data Once depth information or data has been encoded into representative pixels of a visual imaging data file, the modified visual imaging data file, e.g., a steganographic depth image, may be stored in one or more data stores, and utilized for any purpose. For example, the representative pixels having the depth information or data encoded therein may be identified from a stored modified visual imaging data file according to the same pixel traversal strategy by which the representative pixels were originally identified (e.g., at random, according to one or more patterns, or based on attributes of the depth information or data or the visual imaging data). The depth information or data may then be extracted from such representative pixels and utilized for any purpose. For example, as is shown in FIG. 1B, the depth information or data may be utilized to generate one or more pairs of stereoscopic images, e.g., for use in virtual reality applications, or for generating depth maps of a scene, or information regarding depths to objects represented in a scene.

Additionally, once the depth information or data has been extracted from a representative pixel of a steganographic depth image, the color quality of the representative pixel may be restored. For example, where depth information or data is encoded into three least significant bits of a representative pixel of a color channel, and a steganographic depth image is formed thereby, the depth information or data may be subsequently extracted from the steganographic depth image and the color quality of the representative pixel may be restored to the remaining color image by any means, such as by identifying average values of the least significant bits of the representative pixels that are immediately adjacent to or surrounding the representative pixel, and by inserting the average values into the least significant bits of the representative pixel after the depth information or data has been extracted therefrom. Any system, method, technique or algorithm for restoring the use of the least significant bits of a representative pixel of visual imaging data after depth information or data has been extracted therefrom, or for replacing the depth information or data with relevant visual imaging data, may be utilized in connection with embodiments of the present disclosure.

Those of ordinary skill in the pertinent arts will recognize that references to a "least significant bit" herein may refer to not only lowest-valued bits of a pixel (e.g., ones-place bits) but also one or more other bits of comparatively low significance, or "less significant bits," including those bits that may immediately follow or have the next-highest significance above lowest-valued bit in a given pixel. For example, in accordance with the present disclosure, one, two, three or more bits of a representative pixel of a visual image (e.g., a color, grayscale or black-and-white pixel) may be used to store one, two, three or more bits of a corresponding pixel of a depth image. Accordingly, those of ordinary skill in the pertinent arts will recognize that the term "least significant bit," as used herein, may refer to a single bit of a pixel having a lowest value of all bits in the pixel, and may also refer to two or more bits of the pixel having the lowest values of all bits in the pixel.

Figure 2:
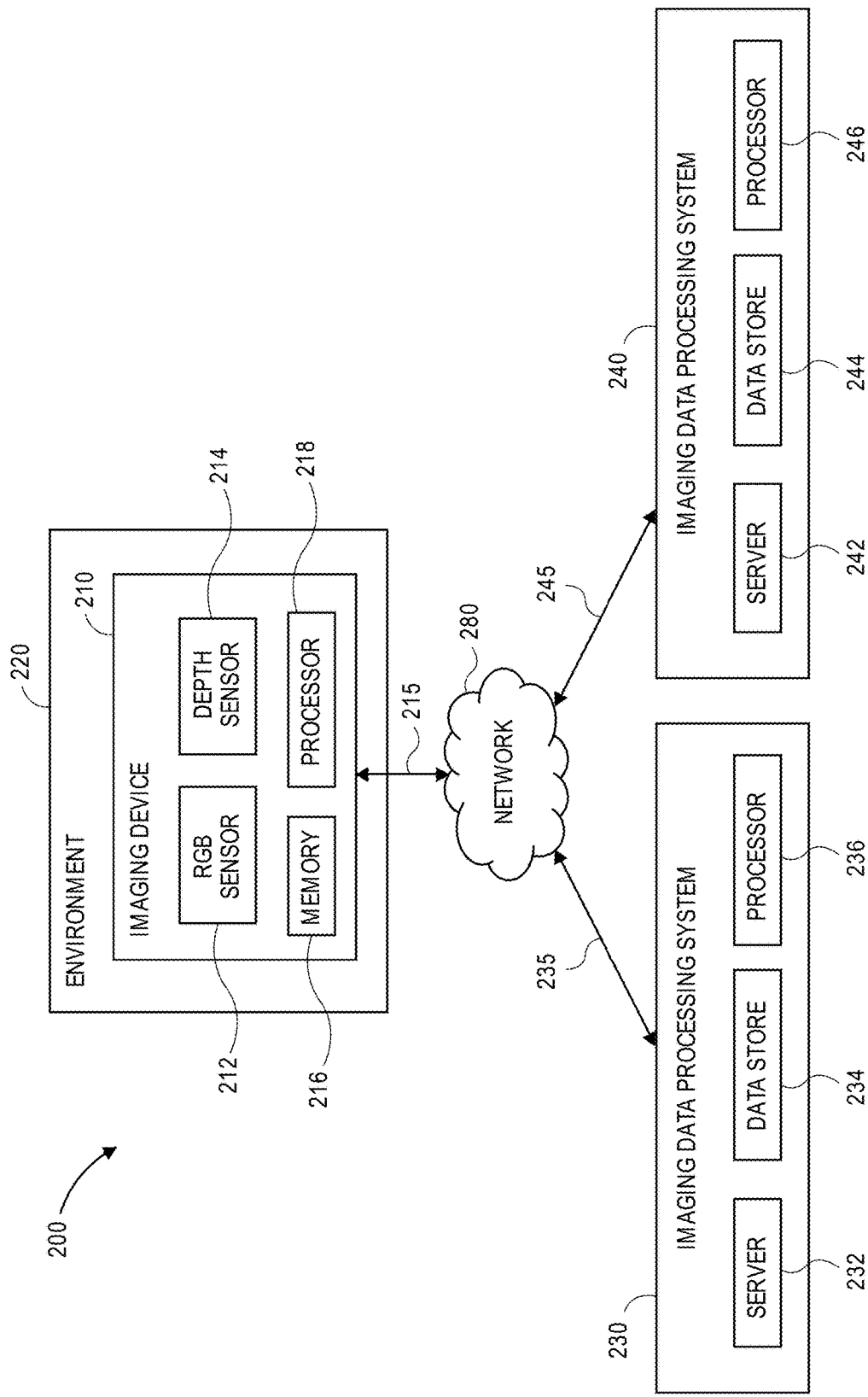
FIG. 2 is a block diagram of components of one system for encoding or decoding steganographic depth images in accordance with embodiments of the present disclosure.

Referring to FIG. 2, a block diagram of components of one system 200 for encoding or decoding steganographic depth images in accordance with embodiments of the present disclosure is shown. Except where otherwise noted, reference numerals preceded by the number "2" shown in the block diagram of FIG. 2 indicate components or features that are similar to components or features having reference numerals preceded by the number "1" shown in the system 100 of FIGS. 1A and 1B.

The system 200 of FIG. 2 includes one or more imaging devices 210 that may be connected to imaging data processing systems 230, 240 over a network 280. The imaging device 210 shown in FIG. 2 is provided in an environment 220, and includes an RGB sensor 212, a depth sensor 214, a memory or storage component 216 and one or more processors 218, along with any other components that may be required in order to capture, analyze and/or store imaging data from within the environment 220 in which the imaging device 210 is provided. For example, the imaging device 210 may capture one or more still or moving images, along with any relevant audio signals or other information, and may also connect to or otherwise communicate with one or more other components, or with the network 280, as indicated by line 215 through the sending and receiving of digital data. Although the system 200 shown in FIG. 2 includes a single imaging device 210, provided in a single environment 220, any number or type of imaging devices or sensors may be provided within a given environment in accordance with the present disclosure.

The imaging device 210 may be any type or form of system component for capturing imaging data (e.g., reflected light) of any kind or for any purpose. For example, in some embodiments, the imaging device 210 may be a red, green, blue ("RGB") color camera, a still camera, a motion capture/video camera or any other type or form of camera. In other embodiments, the imaging device 210 may be a depth-sensing camera, such as an RGBz (or RGBD) camera. In still other embodiments, the imaging device 210 may be a thermographic or infrared (IR) camera. Additionally, in some embodiments, the imaging device 210 may simply be a camera module including a lens and an image sensor configured to convert an optical image obtained by the lens of the camera into a digital signal or digital representation of the image, including image resolutions of varying degrees that may be captured and stored at various rates (e.g., frames per second).

The environments 220 may be any facilities, stations or locations within which one or more imaging devices 210 may be installed and provided for performing monitoring and/or surveillance of activities occurring therein. According to one embodiment, the environment 220 may be a fulfillment center, a warehouse or other like facility; a financial institution, such as a bank or trading floor; a transportation hub or station, such as an airport, a train station or a bus station; or a stadium, a theater, a shopping center or another large-scale venue; or portions thereof.

According to some other embodiments, the environment 220 may further include one or more order processing and/or communication systems using computer devices in communication with one or more of the imaging device 210, the imaging data processing systems 230, 240, or through one or more other computing devices or machines that may be connected to the network 280, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding operations within the environment 220, or the interactions received from the one or more operators, users or workers.

Moreover, the environment 220 may further include one or more control systems that may generate instructions for conducting operations therein. For example, such control systems may be associated with one or more other computing devices or machines, and may communicate with the imaging device 210, the imaging data processing systems 230, 240 or one or more other computer devices (not shown) over the network 280, through the sending and receiving of digital data. Those of ordinary skill in the pertinent art will recognize that the systems and methods of the present disclosure are not limited by any activities that may be performed or functions that may be provided by or within the environment 210 in which the imaging device 210 is provided.

The imaging data processing systems 230, 240 of FIG. 2 may each include one or more physical computer servers 232, 242 having a plurality of databases 234, 244 associated therewith, as well as one or more computer processors 236, 246 provided for any specific or general purpose. For example, the imaging data processing systems 230, 240 of FIG. 2 may be independently provided for the exclusive purpose of managing the monitoring of video files or other imaging data captured by the imaging device 210 or, alternatively, provided in connection with one or more physical or virtual services configured to manage or monitor such files, as well as one or more other functions. The servers 232, 242 may be connected to or otherwise communicate with the databases 234, 244 and the processors 236, 246. The databases 234, 244 may store any type of information or data, including digital media files or any like files containing multimedia (e.g., audio and/or video content), for any purpose. The servers 232, 242 and/or the computer processors 236, 246 may also connect to or otherwise communicate with the network 280, as indicated by lines 235, 245, through the sending and receiving of digital data. For example, the imaging data processing systems 230, 240 may be any facilities, stations or locations having the ability or capacity to receive and store information or data, such as digital media files, in one or more data stores, e.g., digital media files received from the imaging device 210, or from one another, or from one or more other external computer systems (not shown) via the network 280.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The imaging device 210 or the imaging data processing systems 230, 240 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the imaging device 210 may be adapted to transmit information or data in the form of synchronous or asynchronous messages to the imaging data processing systems 230, 240 or to any other computer device in real time or in near-real time, or in one or more offline processes, via the network 280. Those of ordinary skill in the pertinent art would recognize that the imaging device 210 or the imaging data processing systems 230, 240 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 218, the processor 236 or the processor 246, or to any other computers or control systems utilized by the imaging device 210 or the imaging data processing systems 230, 240, or within the environment 220, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
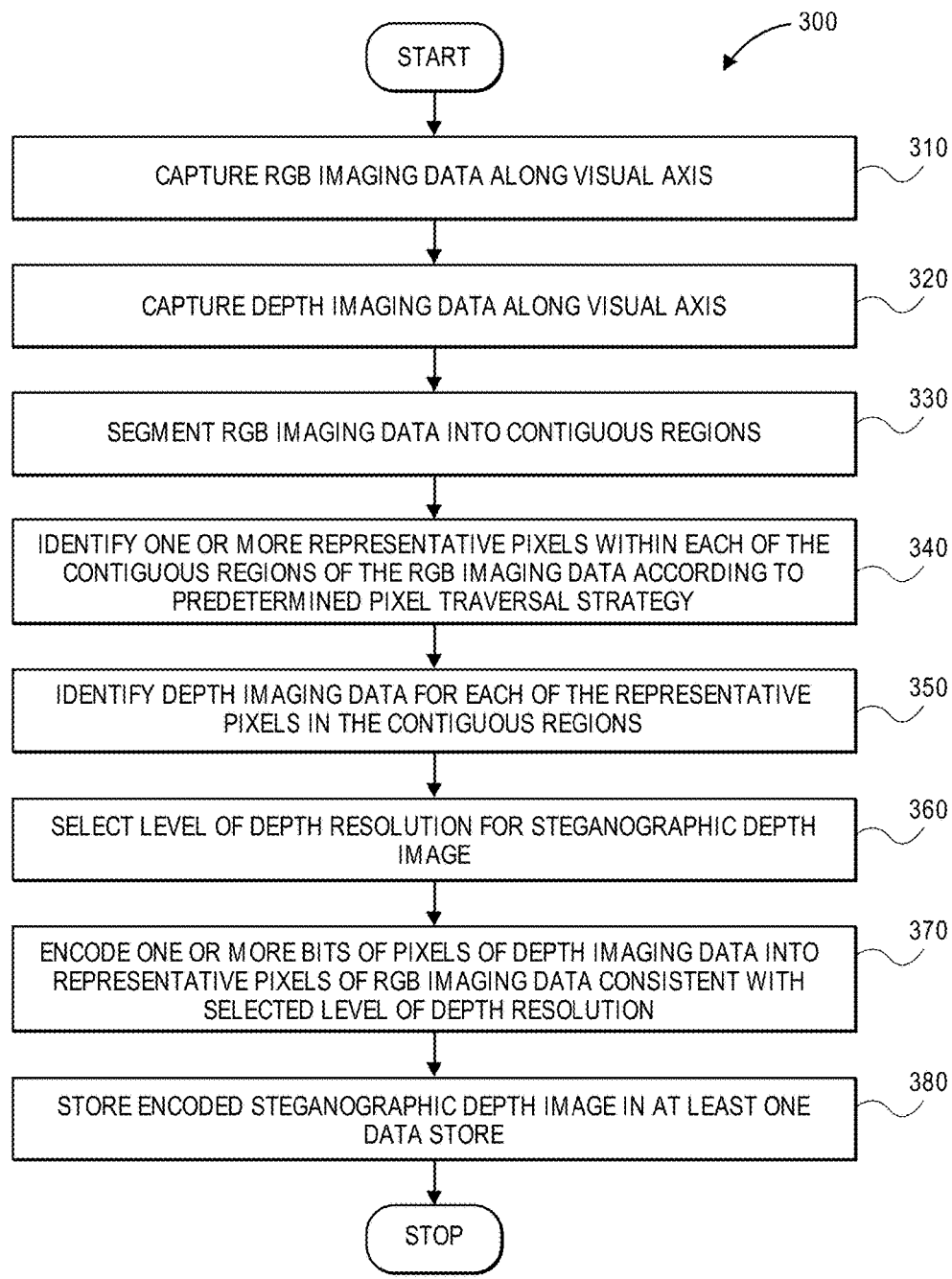
FIG. 3 is a flow chart of one process for encoding steganographic depth images in accordance with embodiments of the present disclosure.

As is discussed above, the systems and methods of the present disclosure may be directed to encoding depth information or data into representative pixels of color imaging data to form a steganographic depth image. The representative pixels into which the depth information or data is to be encoded may be identified within regions defined according to one or more segmentation algorithms or techniques. Referring to FIG. 3, a flow chart 300 representing one embodiment of a process for encoding steganographic depth images in accordance with embodiments of the present disclosure is shown. At box 310, RGB imaging data is captured along a visual axis, e.g., an axis of an imaging device. For example, the imaging device may be a digital camera oriented to capture still or moving images in color within a field of view of the digital camera. Alternatively, instead of RGB imaging data, the imaging device may be configured to capture black-and-white (e.g., grayscale) imaging data along the visual axis.

At box 320, depth imaging data is captured along the visual axis. For example, the depth imaging data may be captured by the same imaging device that captured the RGB imaging data at box 310, e.g., an RGBz (or RGBD) imaging device. Alternatively, the RGB imaging data may be captured using a first imaging device aligned along a visual axis, and the depth imaging data may be captured using a second imaging device aligned along substantially the same visual axis as the first imaging device. At box 330, the RGB imaging data is segmented into contiguous regions. For example, such sectors or regions of the RGB imaging data may be segmented into regions based on features or attributes depicted therein, e.g., the presence or absence of one or more edges, contours, outlines, colors, textures, silhouettes, shapes or other characteristics within the RGB imaging data, or any other attributes of the RGB imaging data or the objects, backgrounds or other features depicted therein. Alternatively, the contiguous regions may be defined by segmenting the depth imaging data, or by segmenting both the color imaging data and the depth imaging data collectively.

At box 340, one or more representative pixels are identified within each of the contiguous regions of the RGB imaging data according to a predetermined pixel traversal strategy. For example, in some embodiments, the representative pixels may be selected at random throughout the RGB imaging data corresponding to the respective contiguous regions in a linear manner, or according to a predetermined pattern that crosses or otherwise considers the RGB imaging data on any other basis, with respect to one or more thresholds. In other embodiments, the representative pixels may be selected based on their respective content. For example, the representative pixels may be selected within substantially "noisy" portions of the respective contiguous regions, e.g., portions of the imaging data having irregular or unnatural variations in pixel characteristics such as brightness, saturation or hue, as determined by resort to metrics regarding levels of variance or signal-to-noise ratios. Alternatively, the representative pixels may be defined based on attributes of the depth imaging data, or on attributes of both the color imaging data and the depth imaging data considered collectively. The representative pixels within the contiguous regions of the RGB imaging data may be selected on any basis in accordance with the present disclosure.

At box 350, depth imaging data for each of the representative pixels in the contiguous regions of the RGB imaging data is identified. For example, pixels within the depth imaging data captured at box 320 which correspond to the representative pixels identified at box 340, the depths associated with each of the representative pixels, or the distances from the imaging device sensor to the features expressed in the RGB imaging data within such pixels, may be identified. Alternatively, depths that have been calculated for the contiguous regions of the RGB imaging data, e.g., based on minimum, maximum, mean or median depths of one or more of the pixels within the contiguous regions, or assigned to the contiguous regions of the RGB imaging data, e.g., based on depth imaging data obtained from an external source, may also be identified.

At box 360, a level of depth resolution is selected for a steganographic depth image to be formed from the RGB imaging data and the depth imaging data. As is discussed above, where greater precision in representing the depths of the various aspects of the RGB imaging data in a steganographic depth image is desired, a larger number of bits in each of the representative pixels of the RGB imaging data and/or a larger number of representative pixels of the RGB imaging data may be dedicated for storing depth information or data therein. Where lesser precision in representing such depths in the steganographic depth image is desired or required, however, a smaller number of the bits in each of the respective pixels of the RGB imaging data and/or a smaller number of representative pixels of the RGB imaging data may be dedicated for storing depth information or data therein. Based on the level of resolution desired, a number of bits of the representative pixels of the RGB imaging data to be occupied by depth information or data in a steganographic depth image may be selected.

At box 370, one or more of the bits of pixels of depth imaging data is encoded into the representative pixels of the RGB imaging data, consistent with the level of depth resolution selected at box 360. For example, as is discussed above, the least significant bits of the respective pixels of color may be replaced with bits corresponding to depth information or data for such pixels, or corresponding to the contiguous regions in which such representative pixels are located, as embodied in the depth imaging data captured at box 320. At box 380, the encoded steganographic depth image created by modifying the representative pixels of the RGB imaging data to include depth information or data corresponding to such pixels or regions is stored in at least one data store, and the process ends. Additionally or alternatively, the encoded steganographic depth image may be stored in association with other information or data (e.g., metadata), including but not limited to a location of each of the representative pixels having depth information or data encoded therein, or a number of such representative pixels. The imaging data included in the steganographic depth image, e.g., both the color imaging data embodied in all of the pixels, and also the depth imaging data embodied in the representative pixels, may then be utilized for any relevant purpose, along with any associated information or data (e.g., metadata).

Figure 4B:
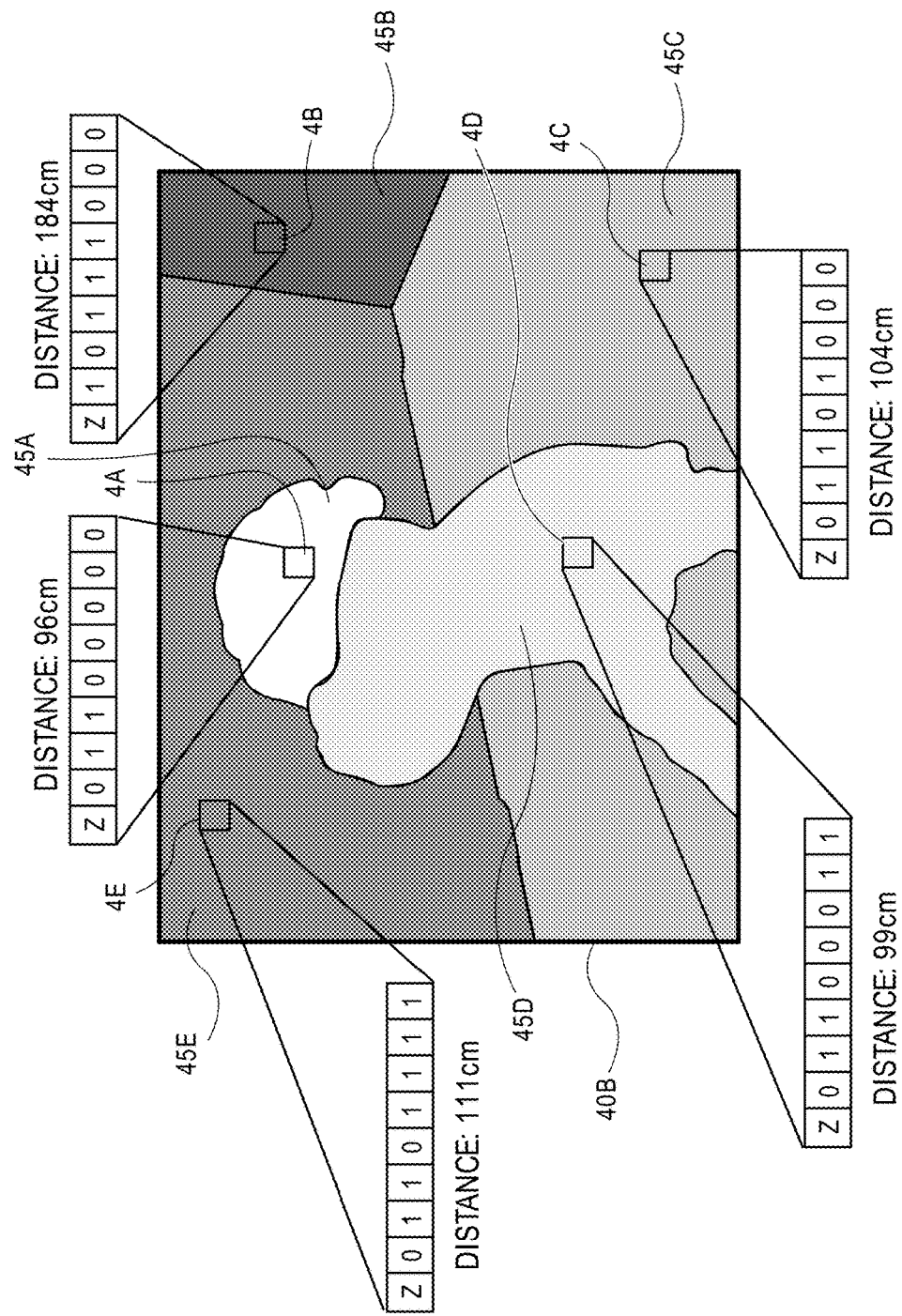
Figure 4C:
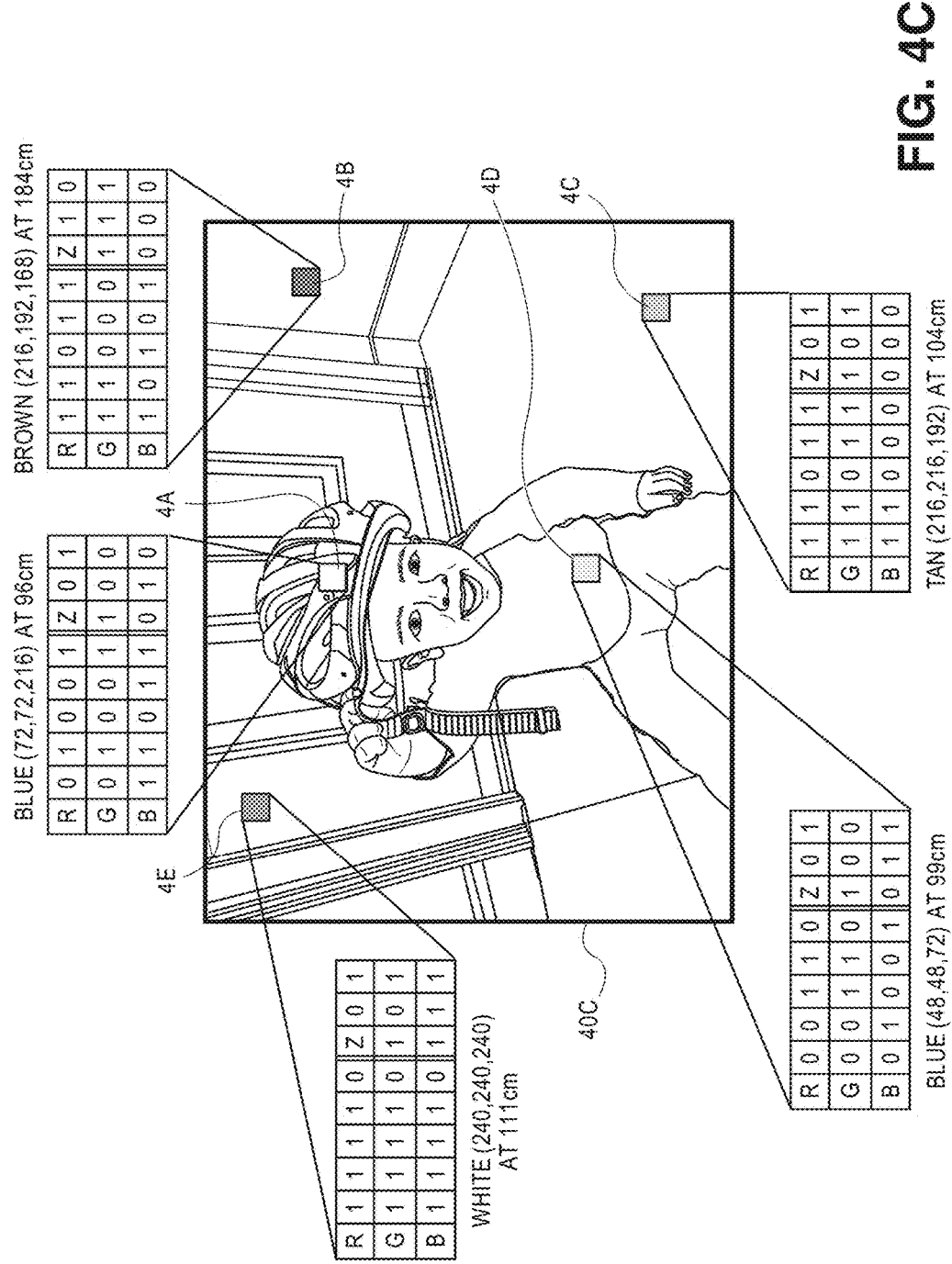

One embodiment for steganographic encoding depth information or data, e.g., depth imaging data, into representative pixels of visual imaging data (e.g., color, grayscale or black-and-white imaging data) is described in FIGS. 4A, 4B and 4C. Referring to FIGS. 4A, 4B and 4C, views of aspects of one process for encoding steganographic depth images in accordance with embodiments of the present disclosure is shown. Except where otherwise noted, reference numerals preceded by the number "4" shown in FIGS. 4A, 4B and 4C indicate components or features that are similar to components or features having reference numerals preceded by the number "2" shown in FIG. 2, or by the number "1" shown in FIGS. 1A and 1B.

Referring to FIG. 4A, visual imaging data 40A may be segmented into a plurality of regions (or sectors) 45A, 45B, 45C, 45D, 45E, and one or more representative pixels 4A, 4B, 4C, 4D, 4E may be identified in each of the regions 45A, 45B, 45C, 45D, 45E. For example, as is shown in FIG. 4A, the visual imaging data 40A includes a region 45A corresponding to a helmet worn by a child, a region 45B corresponding to a background section behind the child, a region 45C corresponding to a foreground section of a floor on which the child is seated, a region 45D corresponding to the child, and a region 45E corresponding to another background section behind the child.

As is also shown in FIG. 4A, at least one representative pixel 4A, 4B, 4C, 4D, 4E is identified in each of the regions 45A, 45B, 45C, 45D, 45E, and the attributes of the visual imaging data 40A in each of the pixels, e.g., the channels and bits of the respective base colors red, green and blue of the pixels, is determined. For example, pixel 4A of the visual imaging data 40A is determined to be a royal blue color having red, green and blue portions of (77, 77, 222) on a 0 to 255 scale, as is shown in three eight-bit channels of binary code. Pixel 4B of the visual imaging data 40A is determined to be an akaroa color having red, green and blue portions of (220, 194, 168), while pixel 4C of the visual imaging data 40A is determined to be a tana color having red, green and blue portions of (219, 219, 195). Pixel 4D of the visual imaging data 40A is determined to be a national flag blue color having red, green and blue portions of (49, 49, 74), while pixel 4E of the visual imaging data 40A is determined to be a gallery white color having red, green and blue portions of (243, 243, 243).

As is shown in FIG. 4B, depths or distances associated with the representative pixels 4A, 4B, 4C, 4D, 4E identified in each of the regions 45A, 45B, 45C, 45D, 45E of the depth imaging data 40B is also determined. For example, a distance to the representative pixel 4A of the region 45A is ninety-six centimeters (96 cm), as is shown in a single eight-bit channel of binary code. A distance to the representative pixel 4B of the region 45B is one hundred eighty-four centimeters (184 cm), while a distance to the representative pixel 4C of the region 45C is one hundred four centimeters (104 cm). A distance to the representative pixel 4D of the region 45D is ninety-nine centimeters (99 cm), while a distance to the representative pixel 4E of the region 45E is one hundred eleven centimeters (111 cm).

In accordance with the present disclosure, one or more least significant bits of representative pixels of visual imaging data may be modified to include bits of depth information corresponding to the representative pixels to form a steganographic depth image. Storage capacity within such bits of visual imaging data may be provided by reducing the color quality of such representative pixels, e.g., preferably to a visually insignificant extent, and inserting depth information for such pixels therein. Referring to FIG. 4C, a modified set 40C of imaging data including depth information encoded into each of the representative pixels 4A, 4B, 4C, 4D, 4E, e.g., a steganographic depth image, is shown. For example, with regard to the representative pixel 4A, the quality of the colors shown therein is reduced slightly from the royal blue color having the red, green and blue portions of (77, 77, 222), as is shown in FIG. 4A, to a blue having red, green and blue portions of (72, 72, 216), and the depth information for the representative pixel 4A is stored in the final three bits of each of the red, green and blue channels. Similarly, the qualities of the colors shown in the representative pixels 4B, 4C, 4D, 4E are reduced slightly from the akaroa color shown in FIG. 4A to a brown having red, green and blue portions of (216, 192, 168), from the tana color shown in FIG. 4A to a tan having red, green and blue portions of (216, 216, 192), from the national flag blue color shown in FIG. 4A to a blue having red, green and blue portions of (48, 48, 72) and from the gallery white color shown in FIG. 4A to a white having red, green and blue portions of (240, 240, 240).

Thus, with a minimal and visually insignificant alteration to one or more select representative pixels located within discrete regions of visual imaging data or the depth imaging data, depth information corresponding to such select representative pixels within such regions may be encoded therein, and used for any purpose. The representative pixels may be identified within such regions according to one or more pixel traversal strategies which may select one or more of the representative pixels on any basis, including but not limited to their respective locations within the discrete regions, attributes (e.g., values) of such pixels, or associations of such pixels within the discrete regions of the visual imaging data or the depth imaging data. After a steganographic depth image having depth information encoded therein has been generated and stored, the representative pixels which include the depth information may be identified within the modified set of imaging data according to the same pixel traversal strategies from which the representative pixels were identified in the visual imaging data.

Moreover, although the visual imaging data 40A of FIG. 4A includes twenty-four bits per pixel, including three channels of eight bits each corresponding to the colors red, green and blue, those of ordinary skill in the pertinent arts will recognize that the systems and methods disclosed herein may be utilized in connection with visual imaging data having any number of bits per pixel, and that such bits may be provided in any number of channels. Likewise, although the depth imaging data 40B of FIG. 4B includes a single eight-bit channel per pixel, those of ordinary skill in the pertinent arts will also recognize that the systems and methods disclosed herein may be utilized in connection with depth imaging data having any number of bits per pixel, and that such bits may also be provided in any number of channels. Additionally or alternatively, although the steganographic depth image of FIG. 4C is shown as including all depth information corresponding to a region in a single representative pixel for each region, the depth information may instead be distributed and encoded in multiple representative pixels in each region according to one or more of the pixel traversal strategies described herein.

Figure 5:
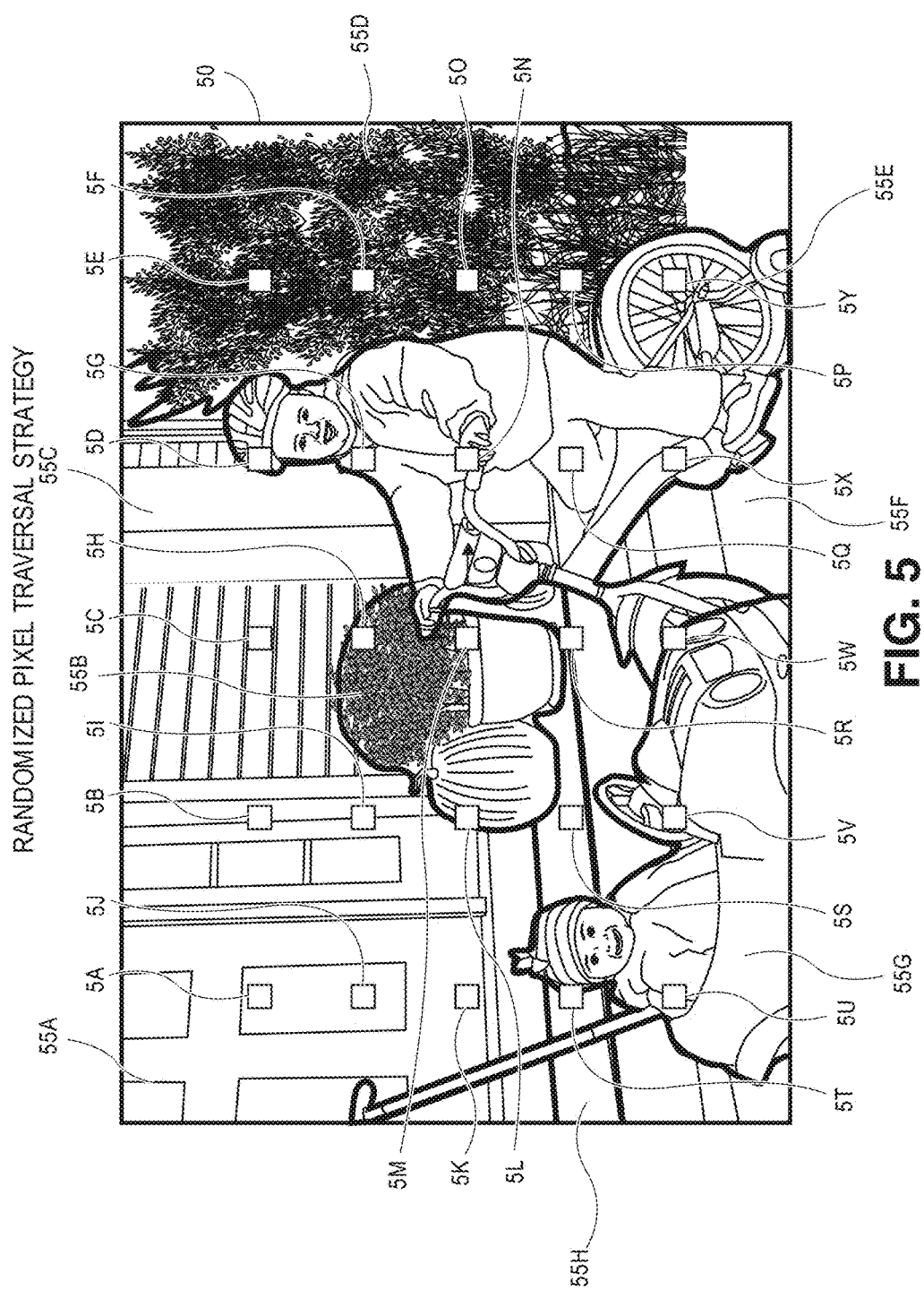
FIG. 5 is a view of aspects of one process for encoding or decoding steganographic depth images in accordance with embodiments of the present disclosure.
Figure 6:
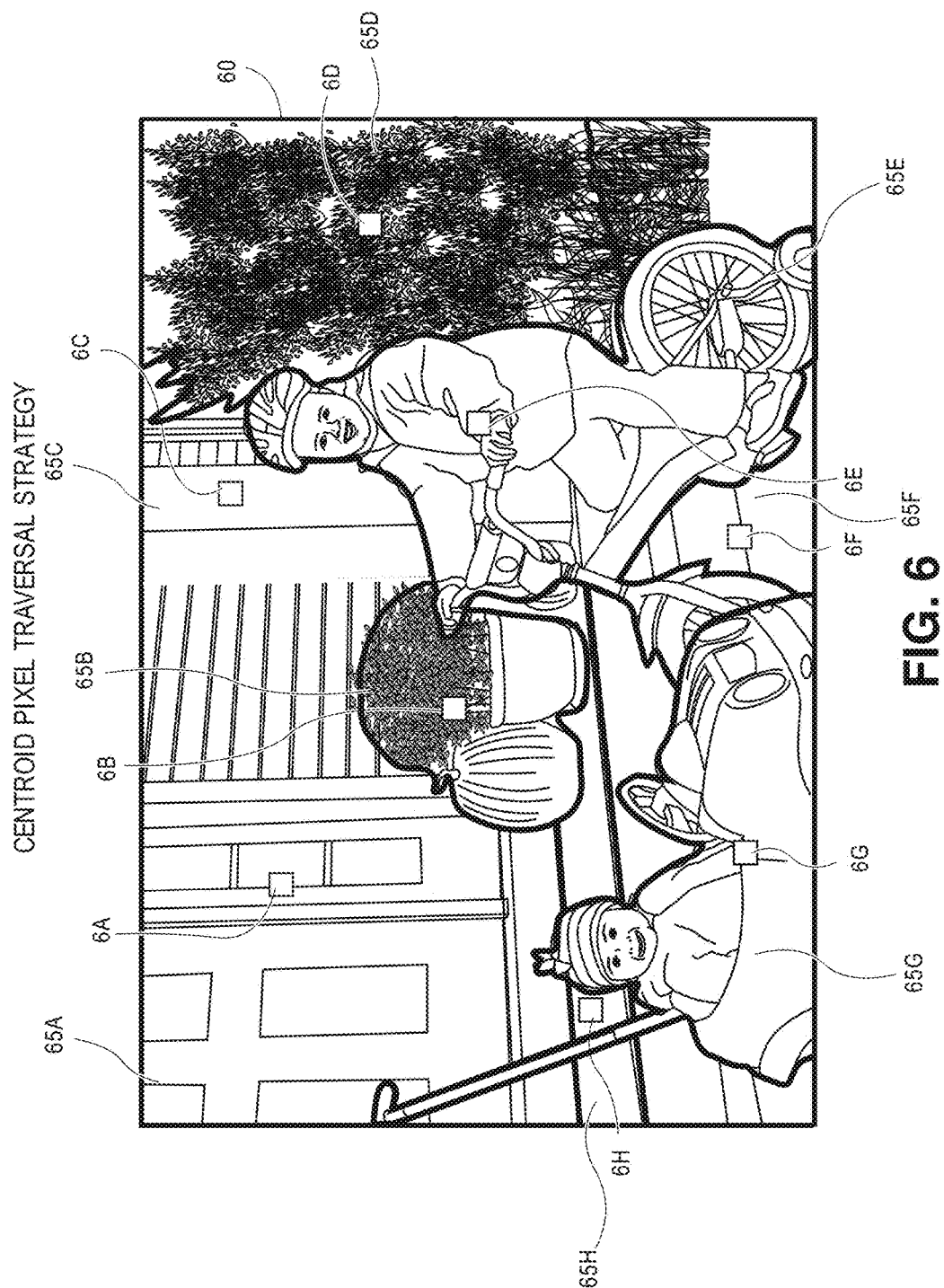
FIG. 6 is a view of aspects of one process for encoding or decoding steganographic depth images in accordance with embodiments of the present disclosure.
Figure 7:
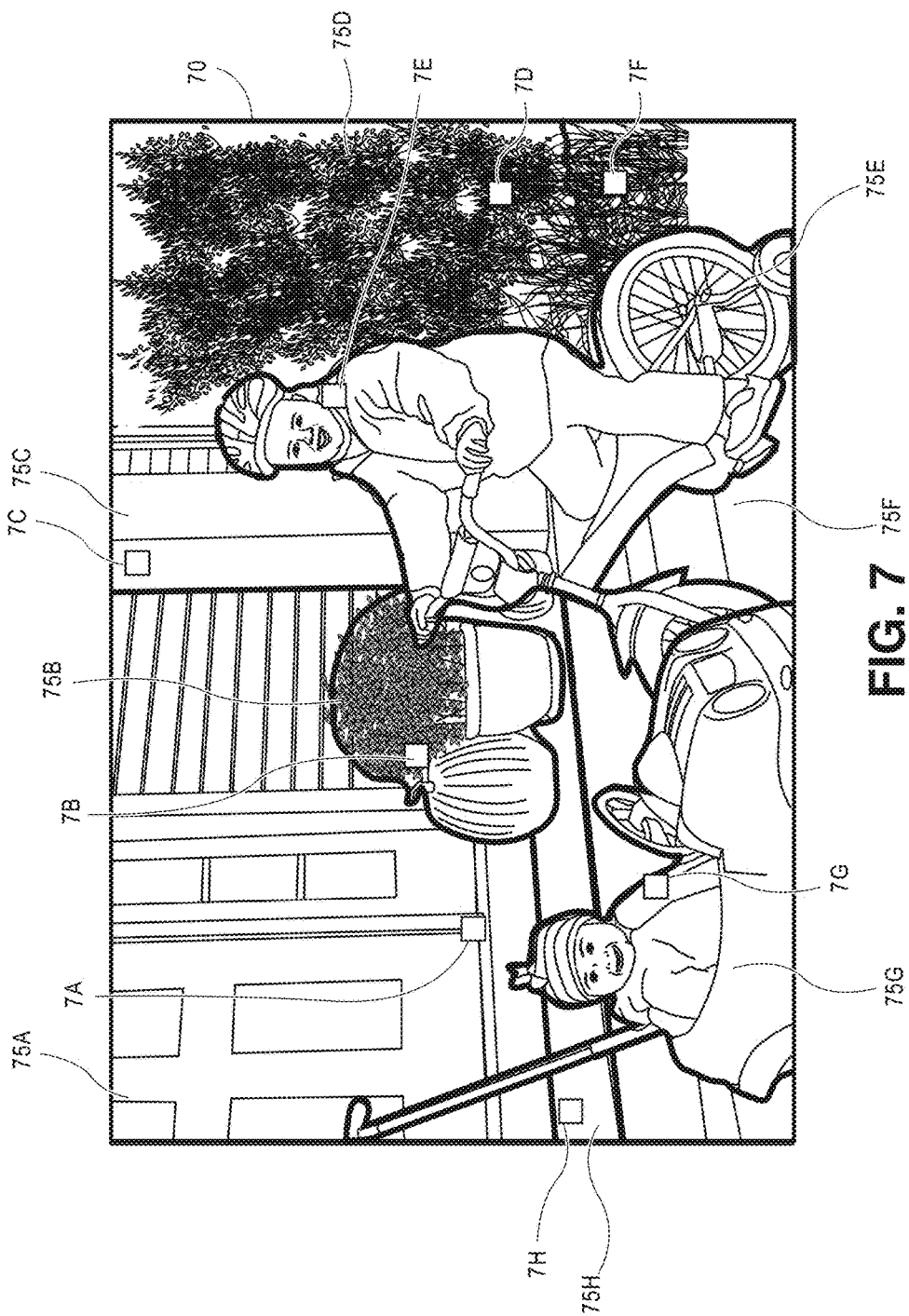
FIG. 7 is a view of aspects of one process for encoding or decoding steganographic depth images in accordance with embodiments of the present disclosure.

As is discussed above, representative pixels may be identified within visual imaging data according to any pixel traversal strategy and on any basis. Referring to FIGS. 5, 6 and 7, views of aspects of processes for encoding or decoding steganographic depth images in accordance with embodiments of the present disclosure are shown. Except where otherwise noted, reference numerals preceded by the number "5" shown in FIG. 5, by the number "6" shown in FIG. 6 or by the number "7" shown in FIG. 7 indicate components or features that are similar to components or features having reference numerals preceded by the number "4" shown in FIGS. 4A, 4B and 4C, by the number "2" shown in FIG. 2, or by the number "1" shown in FIGS. 1A and 1B.

Referring to FIG. 5, a set of visual imaging data 50 is shown, with a plurality of pixels 5A, 5B, 5C, 5D, 5E, 5F, 5G, 5H, 5I, 5J, 5K, 5L, 5M, 5N, 5O, 5P, 5Q, 5R, 5S, 5T, 5U, 5V, 5W, 5X, 5Y in evenly spaced vertical and horizontal intervals along the set of visual imaging data 50. Additionally, the visual imaging data 50 is further segmented into regions 55A, 55B, 55C, 55D, 55E, 55F, 55G, 55H.

According to one pixel traversal strategy of the present disclosure, representative pixels may be identified by selecting one or more of the evenly spaced pixels 5A, 5B, 5C, 5D, 5E, 5F, 5G, 5H, 5I, 5J, 5K, 5L, 5M, 5N, 5O, 5P, 5Q, 5R, 5S, 5T, 5U, 5V, 5W, 5X, 5Y based on their respective locations within the regions 55A, 55B, 55C, 55D, 55E, 55F, 55G, 55H. For example, where a pixel traversal strategy calls for selecting the upper-most of the pixels 5A, 5B, 5C, 5D, 5E, 5F, 5G, 5H, 5I, 5J, 5K, 5L, 5M, 5N, 5O, 5P, 5Q, 5R, 5S, 5T, 5U, 5V, 5W, 5X, 5Y within each of the regions 55A, 55B, 55C, 55D, 55E, 55F, 55G, 55H, one of pixels 5A, 5B, 5C would be identified for the region 55A, the pixel 5H would be identified for the region 55B, the pixel 5D would be identified for the region 55C, the pixel 5E would be identified for the region 55D, the pixel 5G would be identified for the region 55E, the pixel 5R would be identified for the region 55F, one of the pixels 5U, 5V, 5W would be identified for the region 55G and either of the pixels 5S, 5T would be identified for the region 55H. Thus, depth information corresponding to each of the regions 55A, 55B, 55C, 55D, 55E, 55F, 55G, 55H could be identified in a corresponding set of depth imaging data (not shown) and steganographically encoded into one or more of the least significant bits of the selected pixels to form a steganographic depth image.

Referring to FIG. 6, a set of visual imaging data 60 is shown, subject to a pixel traversal strategy by which representative pixels are located at or near centroids of each of a plurality of segmented regions 65A, 65B, 65C, 65D, 65E, 65F, 65G, 65H. For example, as is shown in FIG. 6, the pixel traversal strategy may be used to identify a plurality of pixels 6A, 6B, 6C, 6D, 6E, 6F, 6G, 6H within centroids of regions defined within the set of visual imaging data 60, according to one or more segmentation algorithms or techniques. The pixel traversal strategy may be used to identify the pixels 6A, 6C, 6F, 6H associated with a building in a background of the visual imaging data 60, e.g., a region 65A corresponding to a door or portal, a region 65C corresponding to a column, a region 65F corresponding to a set of stairs, and a region 65H corresponding to a horizontal surface of an entryway. The pixel traversal strategy may also be used to identify the pixels 6B, 6D associated with flora and fauna in a vicinity of the building in the background of the visual imaging data 60, e.g., a region 65B corresponding to a flower pot and a region 65D corresponding to a planted tree, as well as the pixels 6E, 6G associated with regions 65E, 65G corresponding to children in a foreground of the visual imaging data 60.

Subsequently, depth information associated with each of the regions 65A, 65B, 65C, 65D, 65E, 65F, 65G, 65H may be identified from a corresponding set of depth imaging data (not shown), and steganographically encoded into one or more least significant bits of the respective pixels 6A, 6B, 6C, 6D, 6E, 6F, 6G, 6H, thereby forming a steganographic depth image that includes depths or distances to objects associated with the set of visual imaging data 60 in the pixels 6A, 6B, 6C, 6D, 6E, 6F, 6G, 6H.

Referring to FIG. 7, a set of visual imaging data 70 is shown, subject to a pixel traversal strategy by which representative pixels are located in areas of the visual imaging data 70 having high variance in pixel intensity (e.g., high variation in color or texture, or high image noise), or areas of low signal-to-noise ratios. For example, as is shown in FIG. 7, the pixel traversal strategy may be used to identify a plurality of pixels 7A, 7B, 7C, 7D, 7E, 7F, 7G, 7H in a plurality of regions 75A, 75B, 75C, 75D, 75E, 75F, 75G, 75H. The pixel traversal strategy may be used to identify pixels within portions of such regions 75A, 75B, 75C, 75D, 75E, 75F, 75G, 75H of the visual imaging data 70 wherein the pixel variations or image noise within such regions are sufficiently high, such that the modification of such pixels 7A, 7B, 7C, 7D, 7E, 7F, 7G, 7H to include depth information will not be readily apparent to the human eye within the visual imaging data 70, and will cause minimal disruptions thereto.

Subsequently, depth information associated with each of the regions 75A, 75B, 75C, 75D, 75E, 75F, 75G, 75H may be identified from a corresponding set of depth imaging data (not shown), and steganographically encoded into one or more least significant bits of the respective pixels 7A, 7B, 7C, 7D, 7E, 7F, 7G, 7H, thereby enabling the set of visual imaging data 70 to also include depths or distances to objects associated with such pixels 7A, 7B, 7C, 7D, 7E, 7F, 7G, 7H.

Those of ordinary skill in the pertinent arts will recognize that any type or form of pixel traversal strategies for identifying representative pixels of visual imaging data, or depth imaging data, may be utilized on any basis. For example, in addition to the geography-based, centroid-based or noise-based pixel traversal strategies shown in FIG. 5, FIG. 6 or FIG. 7, respectively, any other strategies for selecting representative pixels based on attributes of visual imaging data or depth imaging data may be used in accordance with the present disclosure.

Figure 8:
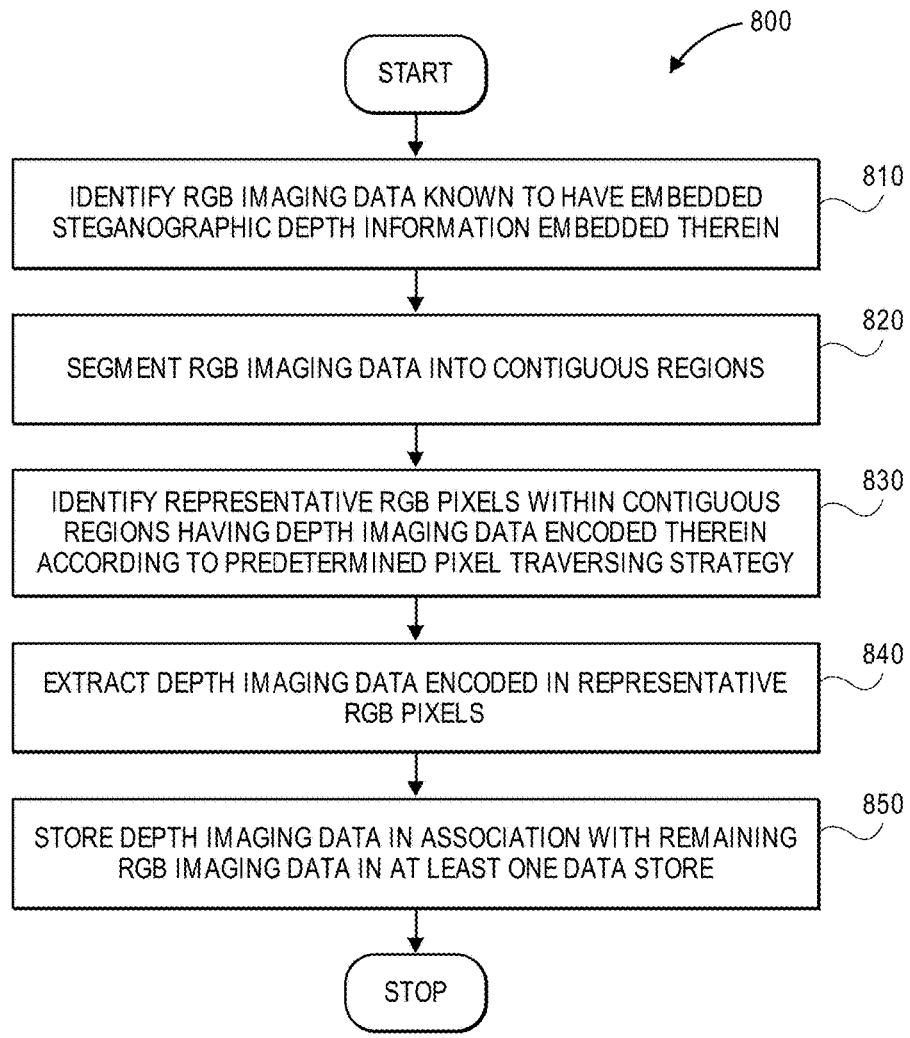
FIG. 8 is a flow chart of one process for decoding steganographic depth images in accordance with embodiments of the present disclosure.

As is discussed above, once depth information has been encoded into representative pixels of visual imaging data (e.g., color imaging data, grayscale imaging data or black-and-white imaging data) to form a steganographic depth image, the modified visual imaging data included in the steganographic depth image may be utilized for any purpose. Referring to FIG. 8, a flow chart 800 representing one embodiment of a process for encoding steganographic depth images in accordance with embodiments of the present disclosure is shown. At box 810, RGB imaging data known to have steganographic depth information embedded therein is identified. Alternatively, any type of visual imaging data (e.g., black-and-white imaging data or grayscale imaging data) having steganographic depth information embedded therein may be identified.

At box 820, the RGB imaging data having the depth imaging data encoded therein is segmented into contiguous regions. For example, in the same manner that visual imaging data may be segmented into contiguous regions according to one or more segmentation algorithms or techniques prior to encoding depth information into one or more pixels thereof, visual imaging data having depth information already encoded therein may also be segmented into one or more of such regions. At box 830, representative RGB pixels within the contiguous regions having depth information encoded therein are identified according to a predetermined pixel traversal strategy, which corresponds to the same pixel traversal strategy that was utilized when identifying the representative RGB pixels prior to encoding the depth information therein. For example, the pixel traversal strategy may identify the representative pixels randomly, based on the sizes or locations of the contiguous regions defined at box 820, based on one or more attributes of the representative RGB pixels themselves, e.g., the presence or absence of specific colors, textures or other predetermined features, or on any other factor. Alternatively, the pixel traversal strategy may identify the representative pixels based on information regarding the imaging data maintained in one or more data files, e.g., a record maintained in metadata provided within the RGB imaging data, or any other record maintained in any other data file associated with the RGB imaging data.

At box 840, the depth imaging data encoded in the representative RGB pixels is extracted therefrom. For example, a number of least significant bits including depth imaging data within the representative pixels of RGB imaging data may be determined, and the values within such pixels may be copied and converted to relative or absolute values associated with such depths. At box 850, the depth imaging data is stored in association with the remaining RGB imaging data in at least one data store, and the process ends. The depth imaging data and the RGB imaging data from which the depth imaging data was extracted may be utilized for any purpose, including but not limited to the use of either the depth imaging data or the RGB imaging data in generating stereoscopic images for use in virtual reality systems, or for generating a depth map. Once the representative RGB pixels are identified and the depth imaging data encoded therein is extracted therefrom and stored in at least one data store, additional information or data (e.g., metadata) such as a location of each of the RGB representative pixels within a given region, a number of the RGB representative pixels which include depth imaging data encoded therein, or a number of bits of each pixel which include depth imaging data encoded therein, may be determined and stored in at least one data store, in association with the depth imaging data and/or the remaining RGB imaging data.

Figure 9:
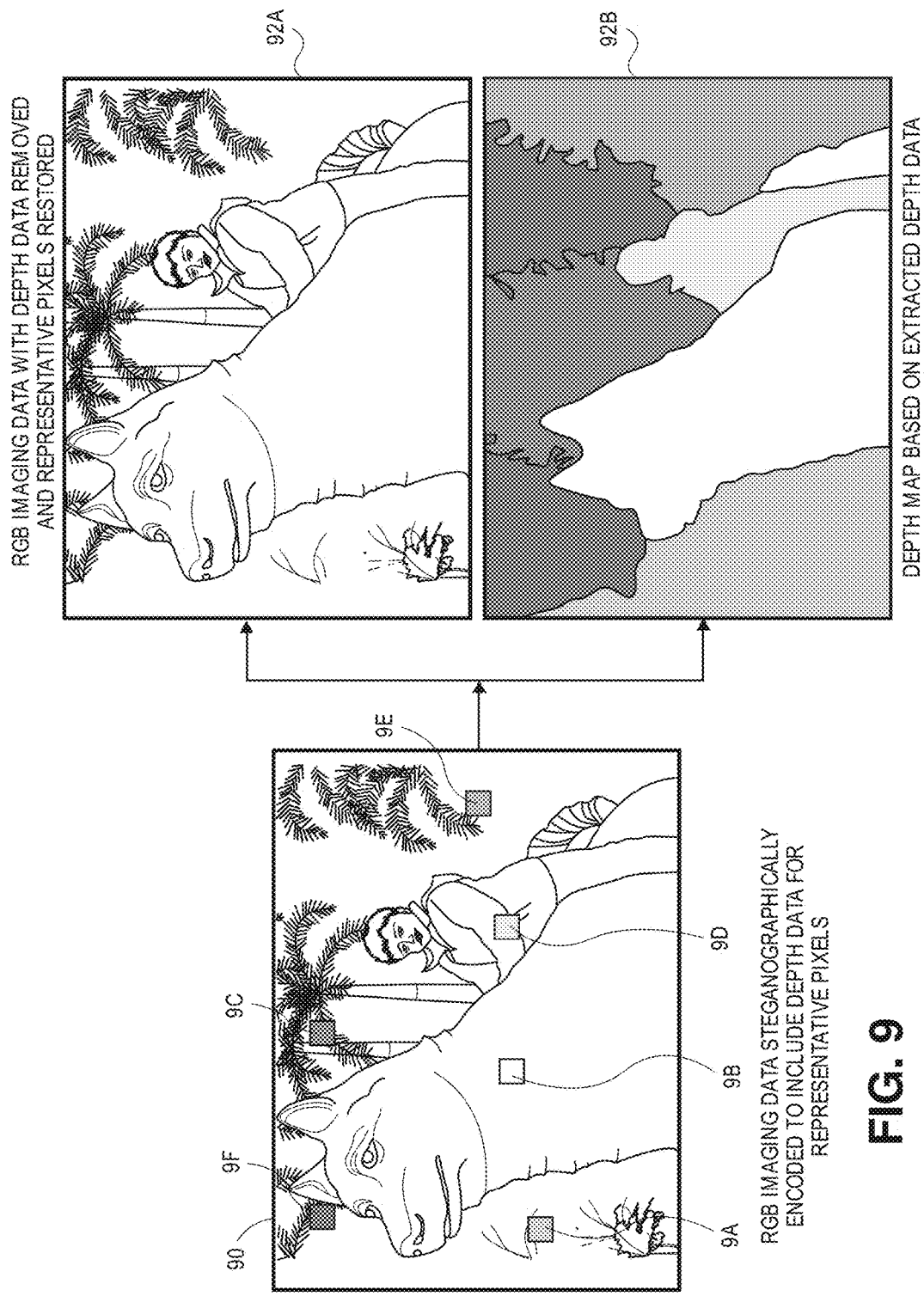
FIG. 9 is a view of aspects of one process for decoding steganographic depth images in accordance with embodiments of the present disclosure.

Referring to FIG. 9, a view of aspects of processes for encoding or decoding steganographic depth images in accordance with embodiments of the present disclosure is shown. Except where otherwise noted, reference numerals preceded by the number "9" shown in FIG. 9 indicate components or features that are similar to components or features having reference numerals preceded by the number "7" shown in FIG. 7, by the number "6" shown in FIG. 6, by the number "5" shown in FIG. 5, by the number "4" shown in FIGS. 4A, 4B and 4C, by the number "2" shown in FIG. 2, or by the number "1" shown in FIGS. 1A and 1B.

As is shown in FIG. 9, a composite set of RGB imaging data 90 including steganographically encoded depth data encoded into representative pixels 9A, 9B, 9C, 9D, 9E, 9F is shown. The set of RGB imaging data 90 may be processed to locate and extract the depth information from the one or more representative pixels 9A, 9B, 9C, 9D, 9E, 9F, e.g., by identifying the representative pixels according to a pixel traversal strategy and copying values of a predetermined number of least significant bits of the representative pixels. Once the depth information is extracted from the representative pixels 9A, 9B, 9C, 9D, 9E, 9F, the depth information and the remaining visual imaging data may be used for any purpose. For example, values of the visual imaging data within the representative pixels may be restored, e.g., by determining average values of the corresponding least significant bits of one or more neighboring representative pixels, inserting such average values in lieu of the extracted depth information, and saving a modified set of RGB imaging data 92A with the representative pixels so modified. Thus, the full color capacity of such representative pixels may be restored, and the least significant bits may most closely approximate the least significant bits of other pixels that are similarly situated to the representative pixels.

Additionally, a depth map 92B may also be formed from the depth information included in the representative pixels. For example, as is discussed above, one or more segmentation algorithms or techniques may be performed on the set of RGB imaging data 90, and one or more contiguous regions or sectors may be defined thereby. Subsequently, the depth information of the representative pixels within such regions or sectors may be assigned to such regions or sectors as indicators of their respective depths. Thus, the depth map 92B may represent depths or distances to the various elements shown within the RGB imaging data 90. The precision and accuracy of the depth map 92B may be defined as a function of the number or location of the various regions or sectors, or the representative pixels therein, as well as the number of least significant bits within such representative pixels that are occupied by depth information corresponding to such representative pixels, or on any other factor.

Although some of the embodiments disclosed herein reference the identification of representative pixels within visual imaging data (e.g., color imaging data, grayscale imaging data or black-and-white imaging data), and the encoding of corresponding depth information into the representative pixels to form a steganographic depth image, those of ordinary skill in the pertinent art will recognize that the systems and methods disclosed herein may be utilized to embed visual imaging data into representative pixels of depth imaging data. For example, where a set of depth imaging data is segmented into one or more regions or sectors according to a segmentation algorithm or technique, and representative pixels are identified from each of the regions or sectors of the depth imaging data, bits of visual imaging data pixels (e.g., color imaging data, grayscale imaging data or black-and-white imaging data pixels) may be encoded into the representative pixels of the depth imaging data. Thus, a steganographic color image may be formed using depth imaging data along with color, grayscale or black-and-white values associated with representative pixels of segmented regions or sectors of the depth imaging data in the same manner that a steganographic depth image may be formed using visual imaging data along with depth values associated with representative pixels associated with segmented regions or sectors of the visual imaging data in accordance with one or more of the embodiments disclosed herein.

Additionally, those of ordinary skill in the pertinent arts will recognize that one or more of the embodiments of the systems and methods disclosed herein may have numerous uses in a number of fields or applications. For example, imaging devices may be programmed or configured to capture both visual imaging data (e.g., RGB imaging data or grayscale imaging data) and depth imaging data, to steganographically encode at least some of the depth imaging data into representative pixels provided in segmented regions or sectors of the visual imaging data, and to store or transmit the visual imaging data with the depth imaging data encoded therein. Steganographically encoding depth information within the visual imaging data according to some embodiments of the present disclosure has been observed to only slightly increase the sizes of files that previously contained the visual imaging data alone, e.g., increases of approximately two percent of a total file size, when storing depth information within RGB imaging data or grayscale imaging data. In some implementations, the imaging devices that may be so programmed or configured include traditional video cameras, digital single-lens reflex (SLR) cameras, or any other type or form of imaging device.

Furthermore, image compression schemes or image encoding schemes may also be adapted to encode depth information into regular compressed images according to one or more compression algorithms, decompression algorithms, or combination compression-decompression algorithms. Additionally, new proprietary file formats for imaging data files which include depth information encoded into one or more representative pixels may be defined. For example, a file format may be defined to include representative pixels at regular or randomized intervals, e.g., according to a pixel traversal strategy similar to that of FIG. 7, or like strategies, thereby leveraging characteristics of a natural image (e.g., texture, noise, or scene clutter) to incorporate depths or distances to one or more scene objects into the corresponding image regions. Such a file format may eliminate the obligation or the hassle associated with the handling of multiple images of a single scene.

Moreover, the systems and methods of the present disclosure may be incorporated for use in augmented reality or virtual reality glasses, or other head-mounted displays. For example, in accordance with the present disclosure, real-time three-dimensional data in the form of visual imaging data paired with depth imaging data may be streamed over bandwidth-limited networks to head-mounted-displays, thereby enhancing the quality and effective volume of the information and data stored within such imaging data without increasing the overhead required to generate, store, transmit or interpret such imaging data.

Similarly, stereographic three-dimensional television systems may also utilize one or more of the embodiments disclosed herein for receiving and displaying three-dimensional scenes without having any noticeable effect on the quality of the images or video streams. Furthermore, the same set of imaging data may be received and displayed on traditional television displays and also on television displays that may be configured to identify representative pixels within such imaging data and display both visual information and depth information on a common display, without any loss of perceptual quality. Likewise, mobile devices such as telephones and tablets may further utilize such embodiments to provide three-dimensional video signals, e.g., to capture and store imaging data including imaging data having visual and depth signals encoded therein on a first mobile device, and to transmit such imaging data to a second mobile device for decoding and display thereon.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments described herein or shown in the accompanying figures refer to the processing of imaging data that is in color, e.g., according to an RGB color model, the systems and methods disclosed herein are not so limited, and may be used to process any type of information or data that is provided in color according to any color model, or in black-and-white or grayscale. In some embodiments, the systems and methods disclosed herein may be used in connection with three-channel, 24-bit visual imaging data having depth imaging data encoded therein. In other embodiments, however, visual imaging data having any number of channels or bits thereof may be used to encode depth imaging data therein.

Additionally, although some of the embodiments disclosed herein reference the capture of both visual imaging data and depth imaging data simultaneously or by using the same imaging device, those of ordinary skill in the pertinent arts will readily recognize that any depth imaging data regarding a scene may be steganographically encoded into visual imaging data regarding the same scene, even if the depth imaging data and the visual imaging data may be independently obtained.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3 or 8, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An imaging device comprising:
   a first imaging sensor configured to capture visual imaging data;
   a second imaging sensor configured to capture depth imaging data;
   at least one memory device; and
   at least one computer processor,
   wherein the at least one computer processor is configured to at least:
      capture a set of visual imaging data regarding a scene using the first imaging sensor;
      capture a set of depth imaging data regarding the scene using the second imaging sensor;
      define a region of the set of the visual imaging data corresponding to at least one object in the scene, wherein the region comprises a plurality of visual pixels corresponding to the at least one object;
      identify a first representative pixel within the region of the set of the visual imaging data according to a pixel traversal strategy, wherein the first representative pixel is one of the plurality of visual pixels, and wherein the pixel traversal strategy comprises at least one of:
         selecting the first representative pixel from the region of the set of the visual imaging data at random;
         selecting the first representative pixel based at least in part on a location of the first representative pixel within the region of the set of the visual imaging data; or
         selecting the first representative pixel based at least in part on at least one attribute of the first representative pixel;
      identify at least one bit corresponding to at least one color of the first representative pixel;
      determine a depth value associated with the region based at least in part on the set of the depth imaging data;
      modify the set of the visual imaging data to replace the at least one bit corresponding to the at least one color of the first representative pixel with at least one bit corresponding to the depth value associated with the region; and
      store a steganographic depth image comprising the modified set of the visual imaging data in at least one data store.

2. The imaging device of claim 1,
   wherein the at least one computer processor is further configured to at least:
      determine, for at least some of the plurality of visual pixels corresponding to the at least one object, a pixel intensity variance; and
      select one of the at least some of the plurality of visual pixels based at least in part on the pixel intensity variance,
      wherein the selected one of the at least some of the plurality of visual pixels is the first representative pixel.

3. The imaging device of claim 1,
   wherein the first representative pixel is a twenty-four bit color digital image pixel comprising a red channel of eight bits, a green channel of eight bits and a blue channel of eight bits,
   wherein the depth value comprises a depth channel of eight bits,
   wherein the at least one computer processor is further configured to at least:
      replace eight bits of the first representative pixel with each of the eight bits of the depth channel,
      wherein each of the eight bits of the first representative pixel is in one of the red channel, the green channel or the blue channel.

4. A computer-implemented method comprising:
   identifying a first set of visual imaging data captured from a scene, wherein the first set of the visual imaging data is stored in a first data store;

defining at least one region of the first set of visual imaging data using at least a first computer processor, wherein the at least one region comprises a first plurality of pixels corresponding to one or more features of the scene;

selecting at least one representative pixel in the at least one region according to a pixel traversal strategy using at least the first computer processor, wherein the pixel traversal strategy comprises at least one of:

selecting the at least one representative pixel from the first plurality of pixels at random;

selecting the at least one representative pixel based at least in part on a location of the at least one representative pixel within the at least one region; or selecting the at least one representative pixel based at least in part on at least one attribute of the at least one representative pixel;

identifying a depth value associated with the at least one region using at least the first computer processor;

modifying the first set of visual imaging data to replace at least one bit corresponding to at least one color of the at least one representative pixel with at least one bit corresponding to the depth value; and storing the modified first set of visual imaging data in at least the first data store.

5. The computer-implemented method of claim 4, wherein the at least one representative pixel is a grayscale digital pixel having at least a first channel of bits corresponding to at least one of a black color or a white color.

6. The computer-implemented method of claim 4, wherein the first set of visual imaging data is a color digital image having at least one channel of bits corresponding to each of a plurality of base colors.

7. The computer-implemented method of claim 6, wherein the at least one representative pixel is an RGB digital pixel having a first channel of bits corresponding to a red color, a second channel of bits corresponding to a green color and a third channel of bits corresponding to a blue color, and wherein the at least one bit corresponding to the at least one color of the at least one representative pixel is in at least one of the first channel, the second channel or the third channel.

8. The computer-implemented method of claim 4, wherein identifying the depth value associated with the at least one region further comprises:

identifying a second set of depth imaging data captured from the scene, wherein the second set of depth imaging data is stored in the first data store;

identifying at least one pixel in the second set of depth imaging data corresponding to the at least one region; and determining a depth associated with the at least one pixel in the second set of depth imaging data corresponding to the at least one region, wherein the depth value associated with the at least one region is identified based at least in part on the depth associated with the at least one pixel in the second set of depth imaging data corresponding to the at least one region.

9. The computer-implemented method of claim 8, wherein identifying the at least one pixel in the second set of depth imaging data corresponding to the at least one region further comprises:

identifying a second plurality of pixels in the second set of depth imaging data associated with the at least one region using at least the first computer processor, and wherein determining the depth associated with the at least one pixel in the second set of depth imaging data corresponding to the at least one region further comprises:

determining depths associated with each of the second plurality of pixels using at least the first computer processor, wherein the depth value is at least one of a minimum, a maximum, a mean or a median of the depths associated with each of the second plurality of pixels.

10. The computer-implemented method of claim 8, wherein each of the first set of visual imaging data and the second set of depth imaging data is captured substantially using a visual sensor and a depth sensor aligned along a substantially common axis.

11. The computer-implemented method of claim 10, wherein a first computer device comprises the visual sensor, the depth sensor, the first computer processor and the first data store.

12. The computer-implemented method of claim 11, further comprising:

transmitting the modified first set of visual imaging data from the first computer device to a second computer device having a second computer processor and a second data store;

identifying the at least one representative pixel of the modified first set of visual imaging data using at least the second computer processor;

extracting the at least one bit corresponding to the depth value from the at least one representative pixel of the modified first set of visual imaging data using at least the second computer processor; and storing the extracted at least one bit corresponding to the depth value in the second data store.

13. The computer-implemented method of claim 4, wherein selecting the at least one representative pixel in the at least one region further comprises:

selecting a second plurality of representative pixels in the at least one region, and wherein modifying the first set of visual imaging data to replace at least one bit corresponding to at least one color of the at least one representative pixel with at least one bit corresponding to the depth value further comprises:

modifying each of the second plurality of representative pixels to replace at least one bit corresponding to at least one color of each of the second plurality of representative pixels with the at least one bit corresponding to the depth value.

14. The computer-implemented method of claim 4, wherein modifying the first set of the visual imaging data to replace the at least one bit corresponding to the at least one color of the at least one representative pixel with the at least one bit corresponding to the depth value further comprises:

identifying at least one least significant bit of the at least one representative pixel using at least the first computer processor, wherein the at least one bit corresponding to the at least one color of the at least one representative pixel is the at least one least significant bit;

determining a binary code representative of the depth value using at least the first computer processor; and replacing the at least one least significant bit of the at least one representative pixel with at least some of the binary code using at least the first computer processor.

15. The computer-implemented method of claim 4, wherein defining the at least one region of the first set of visual imaging data further comprises:
  defining two or more regions of the first set of visual imaging data using at least the first computer processor, wherein each of the two or more regions comprises a plurality of pixels corresponding to at least one of the features of the scene,
wherein selecting the at least one representative pixel in the at least one region further comprises:
  selecting a second plurality of representative pixels, wherein each of the second plurality of representative pixels is in one of the two or more regions, and
wherein identifying the depth value associated with the at least one region further comprises:
  identifying a plurality of depth values, wherein each of the depth values is associated with one of the two or more regions, and
wherein modifying the first set of visual imaging data to replace the at least one bit corresponding to at least one color of the at least one representative pixel with the at least one bit corresponding to the depth value further comprises:
  modifying the first set of visual imaging data to replace at least one bit of each of the second plurality of representative pixels with at least one bit corresponding to the depth value associated with the one of the two or more regions.

16. The computer-implemented method of claim 4, wherein the at least one region of the first set of visual imaging data is defined according to a segmentation algorithm based at least in part on at least one of an edge, a contour, an outline, a color, a texture, a silhouette or a shape set forth in the first set of visual imaging data.

17. A method comprising:
  receiving a first digital image having a plurality of pixels from an imaging device over a network, wherein each of the plurality of pixels comprises visual information regarding a scene, and wherein each of a first set of the plurality of pixels was selected by at least one computer processor operating on the imaging device according to a pixel traversal strategy comprising at least one of selecting the first set of the plurality of pixels at random, selecting the first set of the plurality of pixels based at least in part on locations of the first set within the plurality of pixels, or selecting the first set of the plurality of pixels based at least in part on attributes of the first set, and wherein each of the first set of the plurality of pixels has at least one bit of depth information encoded therein by the at least one computer processor operating on the imaging device;
  defining at least one region of the first digital image according to a segmentation algorithm using at least one computer processor, wherein the at least one region comprises the first set of the plurality of pixels;
  identifying each of the first set of the plurality of pixels of the first digital image according to the pixel traversal strategy using the at least one computer processor;
  extracting the at least one bit of depth information from each of the first set of the plurality of pixels using the at least one computer processor; and
  storing the at least one bit of depth information from each of the first set of the plurality of pixels in at least one data store.

18. The method of claim 17, further comprising:
  defining a depth map of the scene based at least in part on the at least one bit of depth information encoded in each of the first set of the plurality of pixels.

19. The method of claim 17, wherein the first digital image is a color digital image, and
  wherein each of the plurality of pixels comprises a first channel corresponding to a red color, a second channel corresponding to a green color and a third channel corresponding to a blue color.

20. The method of claim 17, wherein the method further comprises:
  storing a second digital image in the at least one data store, wherein the second digital image comprises the plurality of pixels after the at least one bit of depth information has been extracted from each of the first set of the plurality of pixels.

21. The method of claim 17, wherein extracting the at least one bit of depth information from each of the first set of the plurality of pixels further comprises:
  determining, for each of the first set of the plurality of pixels, a value of a least significant bit of at least one adjacent pixel; and
  replacing, for each of the first set of the plurality of pixels, the at least one bit of depth information with the value of the least significant bit of the at least one adjacent pixel.

* * * * *